US009743229B2

(12) United States Patent
Moldavsky et al.

(10) Patent No.: US 9,743,229 B2
(45) Date of Patent: Aug. 22, 2017

(54) SYSTEM AND METHOD FOR FACILITATING INTERPERSONAL CONTACTS AND SOCIAL AND COMMERCIAL NETWORKING

(71) Applicant: ConnectQuest, West Simsbury, CT (US)

(72) Inventors: David Moldavsky, West Simsbury, CT (US); Joseph A. Tocco, Canton, CT (US)

(73) Assignee: CONNECTQUEST, West Simsbury, CT (US)

( * ) Notice: Subject to any disclaimer, the term of this patent is extended or adjusted under 35 U.S.C. 154(b) by 0 days.

(21) Appl. No.: 13/965,951

(22) Filed: Aug. 13, 2013

(65) Prior Publication Data

US 2015/0057020 A1    Feb. 26, 2015

Related U.S. Application Data

(63) Continuation of application No. 13/267,732, filed on Oct. 6, 2011, now abandoned.

(60) Provisional application No. 61/404,606, filed on Oct. 6, 2010.

(51) Int. Cl.
| | | |
|---|---|---|
| H04W 24/00 | (2009.01) | |
| H04W 4/02 | (2009.01) | |
| G06Q 30/02 | (2012.01) | |
| H04L 12/58 | (2006.01) | |
| H04W 4/00 | (2009.01) | |
| H04W 4/20 | (2009.01) | |
| H04L 29/08 | (2006.01) | |
| H04W 64/00 | (2009.01) | |

(52) U.S. Cl.
CPC ............. *H04W 4/02* (2013.01); *G06Q 30/02* (2013.01); *H04L 51/043* (2013.01); *H04L 51/20* (2013.01); *H04L 67/306* (2013.01); *H04W 4/008* (2013.01); *H04W 4/023* (2013.01); *H04W 4/206* (2013.01); *H04W 64/00* (2013.01); *H04L 51/38* (2013.01)

(58) Field of Classification Search
CPC .... H04M 1/72527; H04M 1/04; G06F 1/1632
See application file for complete search history.

(56) References Cited

U.S. PATENT DOCUMENTS

2008/0140650 A1 * 6/2008 Stackpole ...................... 707/5
2009/0164309 A1 * 6/2009 Mgrdechian et al. .......... 705/10

* cited by examiner

*Primary Examiner* — Keith Fang
(74) *Attorney, Agent, or Firm* — Cantor Colburn LLP

(57) ABSTRACT

Disclosed is a mobile computing device application or "mobile application" designed to assist users in performing directed searches within defined geographic scope to achieve specific goals within social, ecommerce and collaborative spaces. The Wireless Wide Area Network (WWAN) is used for data transfer. An Internet-based server is responsible for coordinating all connections between mobile peers. Peer matches are pre-qualified by the server based on available location-based service (LBS) data and other criteria. Short-range wireless communication protocols, such as Bluetooth, radio-frequency identification (RFID), Wibree, UWB (ultra-wideband), WUSB (wireless USB) and WLAN (wireless local area network) connection, are used as a trigger to indicate proximity. Thus, contact between users in close proximity is established without the need for continuous communication between the mobile device and the server.

20 Claims, 28 Drawing Sheets

SYSTEM AND METHOD FOR FACILITATING INTERPERSONAL CONTACTS AND SOCIAL AND COMMERCIAL NETWORKING

This application is a continuation of U.S. application Ser. No. 13/267,732 filed Oct. 6, 2011, which claims priority to U.S. Provisional Application No. 61/404,606 filed on Oct. 6, 2010.

FIELD OF THE INVENTION

The present invention relates to methods and systems for facilitating interpersonal contacts and social and commercial networking.

BACKGROUND OF THE INVENTION

The present invention is designed to be provide a social application for smart cellular telephones and the world wide web to enable people to 1) locate and communicate with other people or groups they have not yet met but with whom they share similar interests or common goals or 2) locate resources for collaboration, buying or selling In targeted marketing (e.g., buying and selling), it is often desirable to provide information to select individuals located in a certain geographic area. The methods and systems of the invention provide a mobile computing device application-based system that enables people to contact one another within each of three broad categories of common purposes: social networking, e-commerce (buying and selling) and common interests or collaboration. Thus, people are able to contact others with similar interests, enabling quick and easy location and communication.

There are a number of technologies known in the art aimed at facilitating communications between users of mobile computing devices who are within close physical proximity. For example, with MIT's Serendipity system users create profiles for themselves and the people they would like to meet. See http://reality.media.mit.edu/serendipity.php [retrieved on 2011 Oct. 6]. However, in the Serendipity system, user information exchanged via short-range radio between mobile devices must then be transmitted over a long-range communications network in order to connect proximate users, see, e.g., U.S. Pat. No. 7,877,082, expending valuable network resources and mobile device battery power. Bluetooth technology, which allows mobile devices to communicate directly with each other, enables short-range communications between mobile devices but is subject to limitations including slow data transfer rates and susceptibility to interference.

In short, the mobile social matching/messaging services disclosed in the prior art have significant shortcomings, including obstacles relating to the proximity detection capabilities of long-range communications systems and bandwidth limitations of short-range radio frequency technology. See U.S. Pub. No. 2007/0037574 A1.

SUMMARY OF THE INVENTION

The present invention provides a method for notifying at least one user $u_i$ of the presence of at least one user $u_k$, the method comprising the steps of: (a) determining locations of users $u_i$ and $u_k$, wherein user $u_i$ has at least one electronic device, $e_i$, and user, $u_k$, has at least one electronic device $e_k$; (b) generating at least one pre-qualifying list of users $u_k$ and sending the pre-qualifying list to user $u_i$, wherein the pre-qualifying list is generated by a server based on criteria $c_i$ for user $u_i$, criteria $c_k$ for user $u_k$ and the locations of users $u_i$ and $u_k$; and (c) notifying the user $u_i$ when user $u_k$ is within about 30 meters of user $u_i$. User $u_k$ may or may not be notified. The electronic devices $e_i$ and $e_k$ can be mobile devices, such as smart phones or cell phones.

The location of the user may be determined by at least one location-based service (LBS), such as GPS (global positioning system), a cell phone tower, and/or an IEEE 802.11 network (WiFi). The location of user $u_i$ may also be a static location selected by the user $u_i$.

The electronic device may be in wireless internet communication with the server, for example, through a Wireless Wide Area Network (WWAN). The electronic device may send a unique user identification to the server before receiving the pre-qualifying list. The criteria, $c_i$ and $c_k$, may comprise a set of user preferences, such as dating preferences, friendship preferences, collaboration preferences and/or purchasing preferences for the user $u_i$. The server may comprise a means for matching criteria $c_i$ and $c_k$. The electronic device $e_i$ comprises a software application for the user to set up the criteria.

The user $u_i$ may be notified when a short-range wireless communication protocol determines the user $u_i$ to be within about 30 meters, within about 25 meters, or within about 25 meters of user $u_k$. Non-limiting examples of the short-range wireless communication protocol include Bluetooth; radio-frequency identification (RFID), Wibree, UWB (ultra-wideband), WUSB (wireless USB) and/or WLAN (wireless local area network) connection.

BRIEF DESCRIPTION OF DRAWINGS

Illustrative embodiments of the present invention as described below with references to the attached drawings, which are incorporated by reference herein.

FIG. 3, which includes FIG. 3A is from a smart phone, FIG. 3B is from a computer.

FIG. 12, which includes FIG. 12A is from a smart phone. FIG. 12B is from a computer.

FIG. 19, which includes FIG. 19A is from a smart phone. FIG. 19B is from a computer.

FIG. 23, which includes

DETAILED DESCRIPTION OF THE INVENTION

Figure 1:
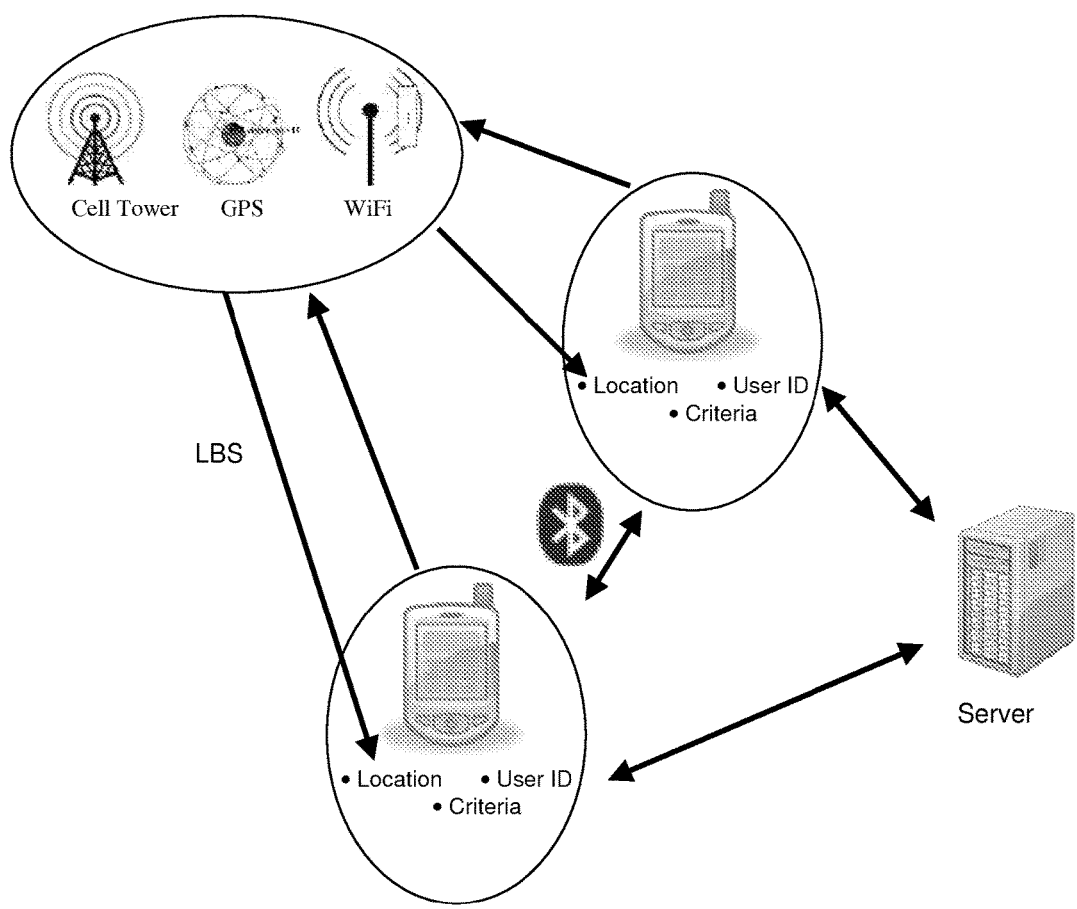
FIG. 1 is a representation of the system and method of the present invention.

The system and method of the present invention, one embodiment of which is identified herein by the name "ConnectQuest™", is a mobile computing device application or "mobile application" designed to assist users in performing directed searches within defined geographic scope to achieve specific goals within social, e-commerce and collaborative spaces.

The present invention provides a method for notifying at least one user $u_i$ of the presence of at least one user $u_k$, comprising the steps of: (a) determining locations of users $u_i$ and $u_k$, wherein user $u_i$ has at least one electronic device, $e_i$, and user, $u_k$, has at least one electronic device $e_k$; (b) generating at least one pre-qualifying list of users $u_k$ and sending the pre-qualifying list to user $u_i$, wherein the pre-qualifying list is generated by a server based on criteria $c_i$ for user $u_i$, criteria $c_k$ for user $u_k$ and the locations of users $u_i$ and $u_k$; and (c) notifying the user $u_i$ when the user $u_k$ is within about 30 meters of user $u_i$. User $u_k$ may or may not be notified. When user $u_k$ is notified, user $u_k$ may be notified at the same time when user $u_i$ is notified, or may be notified when user $u_i$ sends a request.

As used herein, subscripts "i" "k" and "m" are used to distinguish between users, and do not limit the number of users of the present invention.

The criteria for users of the present invention may include a set of user preferences, which can be selected and set up by the users, for example, by a software application on the electronic device. Non-limiting examples of the criteria include dating preferences, friendship preferences, collaboration preferences, selling preferences, location preferences, and/or purchasing preferences, etc. The criteria may be user-defined. The criteria may be modified automatically by the mobile device application based on user's previous viewing preferences. A user may manually modify the criteria; and/or choose to have the criteria updated automatically based on user's viewing preferences. The update of the criteria may occur any time or at a defined time. The criteria may be modified anytime. The present methods and systems may tailor information based on the observed behavior of a user. The information may be analyzed before being presented to the user on a mobile device. The analysis may take into account the user's past actions (e.g., purchasing information, personal preferences, viewing habits, spending habits). The analysis may utilize information associated with past use of the mobile device; the analysis may also retrieve information associated with the user from other servers (e.g., information provided by other vendors on the user). The analysis may also take into consideration the gender and age of the user, as well as information related to a specific location such as demographic information. The criteria may be part of the application on the mobile device. The criteria for each user of the mobile device may be on the servers. The server may comprise a means for matching criteria $c_i$ and $c_k$.

For user $u_i$, the present methods and systems generate at least one pre-qualifying list of the other users $u_k$, and send the pre-qualifying list to user $u_i$. The pre-qualifying list is a list of users who meet user $u_i$'s search criteria. The pre-qualifying list is generated by a server based on criteria $c_i$ for user $u_i$, criteria $c_k$ for user $u_k$ and the locations of users $u_i$ and $u_k$. The number of users on the pre-qualifying list can be 0, 1 or more than one. In one embodiment, the pre-qualifying list is identified herein by the name "Match-O-Meter™" which function shows a total count of all matches available within the selected (e.g., user-defined) search radius (e.g., 1-mile, 5-miles, 10-miles, 50-miles or worldwide).

The present methods and systems can involve one or more than one users, one or more than one electronic devices, one or more than one list, one or more than one server, one piece or more than one piece of information, etc. The electronic device of the present invention may be a mobile device. As used herein, the term "mobile computing device" is interchangeable with the term "mobile device".

The electronic device can be based on any operating system, including, but not limited to, Apple, Droid or Windows-based system, including, for example, Apple iOS, Google Android, Microsoft Windows Phone 7, Nokia Symbian, Research In Motion BlackBerry OS, and embedded Linux distributions such as Maemo and MeeGo.

The distance between two users of the present invention may be less than about 100 meters, less than about 90 meters, less than about 80 meters, less than about 70 meters, less than about 60 meters, less than about 50 meters, less than about 40 meters, less than about 30 meters, less than about 25 meters, less than about 20 meters, less than about 15 meters, less than about 10 meters, or less than about 5 meters.

One of the primary requirements for the ConnectQuest™ application is to provide a means for detecting proximity of users who satisfy a set of search criteria. Most modern smart phones employ a multi-tiered approach to location-based services (LBS). LBS used in the present methods and systems can include any service for identifying a location of a person or object. For example, see, Wikipedia—Location-based service, http://en.wikipedia.org/wiki/Location-based_service[online], [retrieved on 2011 Oct. 6]. The LBS of the present invention can include one or more than one method. Non-limiting examples of LBS include cell phone towers, IEEE 802.11 networks (WiFi), and Global Positioning System (GPS). Depending on which services are available at a current location, it is likely the LBS does not provide sufficient accuracy to determine whether two users are in close (e.g. line-of-sight) proximity.

Bluetooth is a low-power wireless communications protocol which is incorporated into the vast majority of modern mobile devices. The nominal range of Bluetooth in most implementations is 10 meters, which is ideal for determining proximity of peer users. However, Bluetooth has several significant limitations for this purpose. First, at the edges of its range Bluetooth connections tend to be slow and intermittent. If two parties are in motion (e.g. walking in opposite directions on the sidewalk) the proximity duration may be so brief that a connection cannot be established. Finally, interference from nearby electronics, structures, or even human bodies can cause Bluetooth connections to be unreliable at distances of more than a few feet.

The present solution to the problem is to utilize the Wireless Wide Area Network (WWAN) for all data transfer. An Internet-based server is responsible for coordinating all connections between mobile peers. Peer matches are pre-qualified by the server based on available LBS data and other criteria. The Bluetooth is utilized simply as a trigger to indicate proximity. This is described in more detail below.

Server Communications

On a periodic basis, each user $u_i$'s, electronic device, $e_i$, which is a computer or mobile computing device, sends an update to the server, indicating the user's current location as determined by LBS. Depending on which LBS data sources are available, the accuracy of this location may be within 5 miles, 2 miles, or 1 mile, etc. Each user has a unique user identification (e.g., a User ID), which is also sent to the server. The server responds with a list of User ID's for users $u_k$ using electronic devices $e_k$ who match this user $u_i$ based on pre-stored criteria $c_i$ for $u_i$ and $c_k$ for $u_k$, as well as approximate geographic location. For the location matching, a range greater than the typical worst-case LBS accuracy may be used, i.e. 5 miles.

The unique user identification may include any suitable combination of numbers, letters, alphanumerics, or symbols. Any suitable technique may be utilized to provide a unique user identification. By way of examples, any portion or all of the unique user identification may correspond to one or more of the following: a hardware-based number associated with the electronic device, a media access control (MAC) address, a telephone number, an IP Address, or other hardware-based serial numbers or identifications, software-based identifications, a user-defined identification (e.g., a user name) etc.

Bluetooth Discovery

Proximity detection may be achieved using Bluetooth discovery. The "Bluetooth Protocol Specification" may contain what is known as the "Service Discovery Protocol" (SDP). This protocol allows devices to discover which services are available on a peer device. The SDP discovery is fast, low-bandwidth, and functions over an unreliable network connection. SDP discovery is also performed prior to pairing devices or negotiating a connection using a specific Bluetooth Profile.

Each ConnectQuest™-enabled device advertises the ConnectQuest™ service and user's User ID via SDP. (In the case of iPhone®, Bluetooth SDP is wrapped by Apple's® GameKit library, but the underlying mechanism is effectively the same.)

When two ConnectQuest™-enabled devices come within Bluetooth range, the devices retrieve each other's User ID via Bluetooth SDP. Each device compares the received User ID against its internally stored list of potential matches. If a match is found, then the proximity match alert is signaled.

Non-limiting examples of short-range wireless communication protocols include Bluetooth, radio-frequency identification (RFID), Wibree, UWB (ultra-wideband), WUSB (wireless USB) and WLAN (wireless local area network) connection. The present invention provides a novel system and method for establishing contact between users in close proximity without the need for continuous communication between device and server.

Advantages of Approach

The concept described has several key benefits and advantages over prior art systems:

Bluetooth communication is minimized, which allows best possible function under noisy and intermittent conditions. Reliable proximity detection has been found to be possible at distances much greater than the nominal 10-meter Bluetooth range. Specifically, reliable detection is available at ranges including, without limitation, about 30 meters, about 25 meters and about 20 meters.

Network communication is reduced. The devices communicate with the server only on a periodic basis. Power requirements are therefore reduced, since a persistent network connection is not necessary. The system also functions when network connectivity is only intermittent.

Reduced reliance on GPS, which causes higher levels of power consumption by mobile devices than do other, less-accurate methods of determining location. Cellular telephone tower-based location information is "free" to the user and has sufficient accuracy for the present application.

References pertinent to the present technology include the Bluetooth Service Discovery Protocol Tutorial: http://www.palowireless.com/infotooth/tutorial/sdp.asp; and Skyhook Wireless (WiFi-based LBS): http://en.wikipedia.org.wiki/Skyhook_Wireless.

Thus, it can be seen that the present invention provides a novel method and system by which interpersonal contact and communication are promoted and enabled in a manner that is highly effective and efficient. The invention provides, more specifically, systems and methods having the features and advantages described, which are also convenient and enjoyable to utilize, and which employ existing facilities to optimal advantage.

FIG. 1 diagrammatically illustrates a system embodying the present invention. It comprises two mobile devices, such as smart phones. Each mobile device is (1) capable of establishing internet connections; (2) equipped with means for providing, through communication with a location-based system (LBS) (such as GPS, cell phone towers, IEEE 802.11 networks (WiFi), location-based services for determining the geographical location of the device; (3) equipped with a short-range (e.g., 10 meters) wireless communication protocol (e.g., Bluetooth); (4) programmed with the present (e.g., ConnectQuest™) software application; and (5) and has established an account (e.g., ConnectQuest™ account) for each registered user. Each mobile device broadcasts a Bluetooth (or equivalent, short-range) signal, when activated.

The mobile devices are in wireless communication, via the internet, with a server which has been programmed to store, in its database, data defining the criteria for one or more searches, for each user. The server is capable of delivering search criteria information to all properly equipped and connected mobile devices. The server provides the means by which search criteria of system users are compared, and for determining when the criteria of one user sufficiently satisfies or matches those of another. When such a match has been determined to exist, the server transmits relevant information (e.g., user ID, name, photograph) to the mobile device of either or both matched users who are in the same vicinity (e.g., within about a 1-mile, 5-mile, 10-mile, or 30-mile, etc. radius which can also be defined by the user), as indicated by GPS signals. Moreover, the transmission may occur with or without a user-implemented prompt in a pull or push mode, respectively.

When the mobile computing devices of matched users are in sufficiently close proximity, e.g., within about 30 meters, as established by reception of their respective, broadcast Bluetooth signals, the system initiates the generation of a notification or alarm signal, communicated to either or both of the mobile devices. If the relevant user information was not already transmitted (in a "push" mode), either or both of the matched users may initiate such transmission in a "pull" mode after proximity is established by mutual interception of Bluetooth signals. Activation of a visible or audible signal on at least one of the user's mobile computing device may then be used to inform the other matched user of their proximity to one another, whereupon direct, person-to-person contact may be initiated.

The transmission of matched user data and proximity notifications and signals occurs by way of the internet connection that exists between each mobile device and the server. As indicated above, the interception of Bluetooth broadcast signals serves only as a trigger for initiation of a proximity notification or signal and, in the "pull" mode, transmission of data describing a matched user.

As used herein, mobile computing device application or "mobile application" refers to software used on a smart phone or other mobile computing device such as an Android™, iPhone®, BlackBerry® or iPad®. Mobile applications enable users to perform functions on their mobile devices "on-the-go" without the constraints associated with working at fixed locations, such as at home or in the office. It will readily be understood by a person of ordinary skill in the art that mobile applications are not limited to mobile phones, but may also be used on laptops or home computers. Non-limiting examples of the electronic devices include, a mobile phone, a smart phone, a GPS-enabled mobile phone, a CDMA-enabled mobile phone, a GPRS-enabled mobile phone, a mobile phone with a camera, a mobile phone with browser capabilities, a GPS unit, a tracking unit, a portable electronic device with a compass, a laptop computer, a notebook computer, a desktop computer, a home computer, a personal digital assistant (PDA), an MP3 player, a camera, a handheld device, a pager, a portable 20 gaming device, an electronic watch, a handheld GPS, a portable music player (e.g., an Apple iPod), an electronic keychain, a tablet and a tablet computer.

It will also be readily understood that such applications permit users of mobile devices to touch icons, boxes, or buttons on a touch-sensitive interface employed on mobile computing devices to activate certain features of the application. Icons, boxes, or buttons are used interchangeably herein, but the reader should note that other names may be used in the art to describe such means of activating application features.

The detailed description of the invention that follows may be defined using terms associated with algorithms and symbolic representations of operations on data bits within a computer memory. Descriptions based on algorithmic descriptions and representations are frequently used by those of skill in the art to describe the substantive processes and workings of their inventions. An algorithm is an effective method for solving a problem expressed as a finite sequence of instructions or steps. The steps are defined as the physical manipulations of electrical or magnetic signals. Moreover, the detailed description of the invention may be described or labeled in terms of computer programs. Programs are sequences of instructions written to perform a specified task for a computer or similar electronic device. As used throughout this application the use of "program," "process" or "algorithm" is not limited to any particular source code. Instead, these terms are used as convenient labels to describe the functions or executions associated with the invention.

Each of these terms still applies to the appropriate physical quantities and is merely labeled in this fashion for convenience. As will be apparent from the following discussion, it is appreciated that throughout the description, the term "processing" refers to the action and processes of a computer system or similar computing device.

The present invention also relates to any apparatus, tool or computer system for processing information provided by a mobile computing device or laptop or desktop computer. The invention may incorporate a specialized computer for performing the method or any other computer running the required program. The system may use any type of machine-readable storage medium such as read-only memory ("ROM"); random access memory ("RAM"); magnetic disk storage media; optical storage media; flash memory devices; electrical, optical, acoustical or other form of propagated signals (e.g., carrier waves, infrared signals, digital signals, etc.). GANTZ, John F. et al. *"The Diverse and Exploding Digital Universe"*. In International Data Corporation via EMC [online]. March 2008 [retrieved on 2011 Oct. 6]. Retrieved from the Internet: <URL:http://www.emc.com/collateral/analyst-reports/diverse-exploding-digital-universe.pdf>. Various general purpose systems or computer processors may be used with the process and programs described within. These systems may be composed of assortments of servers, processors, engines and computer or machine readable storage media. However, specialized apparatus may also be designed for use with this system.

Processing may be implemented by computer processors executing appropriate sequences of computer-readable instructions contained in the main memory of a computer. A description of how processing is employed in computer-executable applications is provided in, e.g., U.S. Pat. No. 7,921,156.

The system and method is not limited to any particular network. The system and method can function over the internet, local area networks (LAN) or any other types of networks, portions of networks, or through a cloud computing system (see http://en.wikipedia.org/wiki/Cloud_computing [retrieved on 2011 Oct. 6]). Cloud computing is a model for enabling ubiquitous, convenient, on-demand network access to a shared pool of configurable computing resources (e.g., networks, servers, storage, applications and services)

that can be rapidly provisioned and released with minimal management effort or service provider interaction. Cloud computing provides computation, software, data access, and storage services based on internet protocols. The servers for cloud computing contain computer hardware and/or computer software products. The servers may be specifically designed for the delivery of cloud services, including multi-core processors, cloud-specific operating systems and combined offerings. MELL, Peter et al. "The NIST Definition of Cloud Computing (Draft)—Recommendations of the National Institute of Standards and Technology". In NIST Special Publication 800-145 (Draft) [online]. January 2011 [retrieved on 2011 Oct. 6]. Retrieved from the Internet: <URL:http://csrc.nist.gov/publications/drafts/800-145/Draft-SP-800-145_cloud-definition.pdf>.

Furthermore, the system and method is not dependent on any particular data transmission rate. The individual components of the system (i.e. servers, processors, storage media, etc.) may likewise function irrespective of their physical locations as long as they incorporate means of communicating with other components.

Finally, the system and method can incorporate any number of mobile computing devices or terminals. The terminals are used for the input, such as user profile information, or the output, such as the display of search results, of data. The terminals in this case can refer to personal computers, workstations, laptops, monitors, or other communication devices.

The mobile computing device utilized in the present invention may comprise additional capabilities and facilities, such as a random access memory; a display, which may comprise a color display, a backlight, a liquid crystal display (LCD), a light-emitting diode (LED) screen, an organic light-emitting diode (OLED) screen, a flexible organic light-emitting diode (FOLED) screen, or a projection display; a power unit, which may comprise a battery, a power port, a photovoltaic facility such as a solar cell, or a fuel cell; an input unit, which may comprise a touch pad, a key pad, a stylus-based input facility, a speakerphone, or a microphone; a data communication unit, which may comprise a telescoping antenna, a fixed external antenna, an internal antenna, a serial data port, a parallel data port, a WiFi connectivity module, a Bluetooth module, or a ZigBee module; a central processing unit; an operating system; a software application including, but not limited to, a game, a calendar, a notepad, a Web browser, an email client, an audio file player, a photo viewer, a video viewer, a text editor, a time tracker, a clock, a calculator, a dictionary, a file viewer, a synchronization manager, a virtual private network (VPN) client. The mobile device may comprise a radio frequency (RF) transmitter/receiver providing the capability of sending and/or receiving data from a cellular telephone network. The mobile computing device may also or alternatively comprise an RF transmitter/receiver for sending and/or receiving data from a local area network, such as and without limitation an 802.11b "WiFi" network. U.S. Pat. No. 7,848,765.

The battery life of the mobile computing device may be improved by limiting the amount of time that the mobile device is sending and/or receiving data. These methods may comprise varying the length and/or frequency of transmissions to and/or from the mobile computing device.

Communication Between Mobile Computing Device $m_i$ and Server

A mobile computing device $m_i$ may be in wireless internet communication with a server. The communication may be via a cell phone provider, and/or through a public and/or private router, etc. The information may be transmitted via internet protocol, SMS, fax, email, instant message, text message, voice, voicemail, GPRS, CDMA, WAP protocol, internet, text or as a file.

Transmissions to and/or from a mobile device may be adjusted. For example, the length or frequency of the transmissions may be varied. The variation may be in response to velocity, direction, location, a point of interest, an object, and preferences. The variation may result in increased battery life for the mobile device. The data may be stored and transmitted all at once or transmitted as it is updated.

The present methods and systems may obtain multiple data points for a user. The multiple data points may be analyzed.

Multiple mobile computing devices can connect to the server. For example, a laptop can connect to a modem to access the database server. Alternatively, a laptop can connect to the network over an Ethernet or other broadband connection. Additionally, a variety of wireless networks can be utilized to facilitate client-server communications. For example, a laptop and a tablet PC can connect via an internal cellular modem or PC Card cellular modem. A tablet PC or Personal Digital Assistant (PDA) can connect to a wireless access point to communicate with the server. Alternatively, a PDA can connect using a wireless standard such as Bluetooth or via a wired link to a cell phone that can communicate over a network with the server.

Server

The system according to the present invention can contain one or more of the following: a database server for data storage; an application server, and a web server. There may be only one (or one type of) server. There may be only one (or one type of) server serving as both a database server and an application server (and a web server). There may be more than one (or more than one type of) server. For example, there are a database server and an application server. Non-limiting examples of the application server include the Google® AppEngine server. Non-limiting examples of the database server include the Amazon® S3 storage server. The database server may include a set of tables each defining specific data fields and containing data records within each table. Certain tables include data fields that associate a specific record with one or more locations. The data fields may further specify a period of time during which the record is associated with the locations. It should be clear to one of ordinary skill in the art that these servers may exist as one computer, as independent computers, as a network of workstations, as a cluster computer, as a part of a three-tier configuration such as a web client connected via the internet to a plurality of web servers and application servers connected to one or more database servers, and so forth. U.S. Pat. No. 7,890,124; see http://en.wikipedia.org/wiki/Server_(computing) [retrieved on 2011 Oct. 6];

http://en.wikipedia.org/wiki/Application_server [retrieved on 2011 Oct. 6];

http://en.wikipedia.org/wiki/Database_server [retrieved on 2011 Oct. 6].

The data that is stored on the server can be in any suitable format, non-limiting examples of which include an open data file format, a closed data file format, binary format, ASCII format, XML, HTML, SVG, TXT and DAT. See http://en.wikipedia.org/wiki/Data_file [retrieved on 2011 Oct. 6].

The application server may or may not provide a means for comparing filter or search criteria of the mobile device user with the information provided by other mobile computing device users, and for determining when the information from users of the mobile application sufficiently satisfies or matches the filter or search criteria. When a match has been determined to exist, the data storage server transmits, via the internet, matching information to the mobile computing device.

The system and method of the present invention enables users to find people they have not met and helps initiate introductions without awkwardness; it enables people to locate the resources and talent they need, and to pinpoint e-commerce services, such as buying and selling over the internet, and other desirable services. More particularly, the application enables people to quickly and easily define searches for the things they want to find; to define searches to locate and meet new people either around the world or locally (e.g., "around the corner"); to collaborate; to buy, sell and trade, etc. In one preferred embodiment, the mobile application provides a close-proximity search function by which users are alerted when they are within about 75 feet of matching users, providing the opportunity for instant text messaging, contact confirmation and communication between users.

The present invention comprises an advanced cloud-based mobile computing device application that can be downloaded to a cellular smart phone and/or an internet-connected desktop PC or Mac® computer. Versions of the mobile application may be available for the Apple® iPhone®, Droid and Windows® 7 smart phones. An internet browser-based application of the present invention may be accessible to the user at www.connectquest.com. The web-based version of the ConnectQuest™ embodiment of the present invention is functionally identical to the smart phone version, since both versions share the same data. Notably, the web-based version of ConnectQuest™ takes advantage of the larger viewing area available on laptop and desktop computers.

The mobile application of the present invention enables users to:
quickly and easily define specific search criteria;
define searches to encompass the world, a region (such as a country or state), or a local area (e.g., "around the corner");
meet new people, collaborate, buy and sell goods and services;
exchange instant feature-rich multimedia messages with other ConnectQuest™ users;
create user-defined groups, such as business or political contacts, or social groups, for instant feature-rich multimedia messages;
create and manage forum discussion groups within the ConnectQuest™ community;
use a close-proximity search which alerts when a user is within approximately 75 feet of a matching user.

The present invention can be quickly and easily downloaded to a mobile computing device, such as a smart phone, or personal computer from the Apple® "App Store," from the ConnectQuest™ website, or from other phone-specific "App" download sites, such as those available for devices like the Droid®, Windows® Mobile 7, Blackberry® or Palm. It can be used immediately due to its intuitive design, and users of the ConnectQuest™ embodiment are instantly linked to the ConnectQuest™ community (i.e., a community centered upon the ConnectQuest™ website).

First-Time Use

Once users download the ConnectQuest™ application, they are taken to a "Create an Account" screen. In one embodiment, in order to access ConnectQuest™ users are required to create personal accounts and provide user names, passwords and email addresses. The system and method of the present invention automatically verifies the email addresses. Once the verification is completed, the invention activates a ConnectQuest™ personal account, enabling users to access ConnectQuest™ search and command screens.

In one preferred embodiment, first-time use of the system is streamlined utilizing a configuration which enables the system to be used before validating user email addresses. Specifically, the login screens do not require an email message initially. When an unvalidated user is using the mobile application, a message reminding the user to validate is presented on the main screen of the mobile application. As used herein, "unvalidated user" refers to a user who has not provided an email address to ConnectQuest™. When a user taps on this message or attempts to use a function of the application which requires validation, a validation screen appears requesting the user's email address. Additional information is collected at this time including age, birth date and location of the user.

Certain features are blocked for unvalidated users, including messaging and the ability to save matches. In one embodiment, there is a limit on the number of searches a user can create. In such an embodiment, database storage procedures are modified to allow unvalidated users to access required functions. The middleware and mobile application are changed accordingly to handle the new validation workflow.

Users may choose to have the ConnectQuest™ "Log In" screen presented each time the mobile application is accessed, for reasons of security. The "Log In" screen has user name and password fields for users to log into ConnectQuest™. A user can tap the "I've forgotten my username/password" button, and the ConnectQuest™ server sends an email to the user providing his or her user name and password combination.

Search Functionality

As discussed more fully below, ConnectQuest™ searches enable a user to specify certain criteria, so that devices with matching criteria alert when they approach each other.

Figure 2:
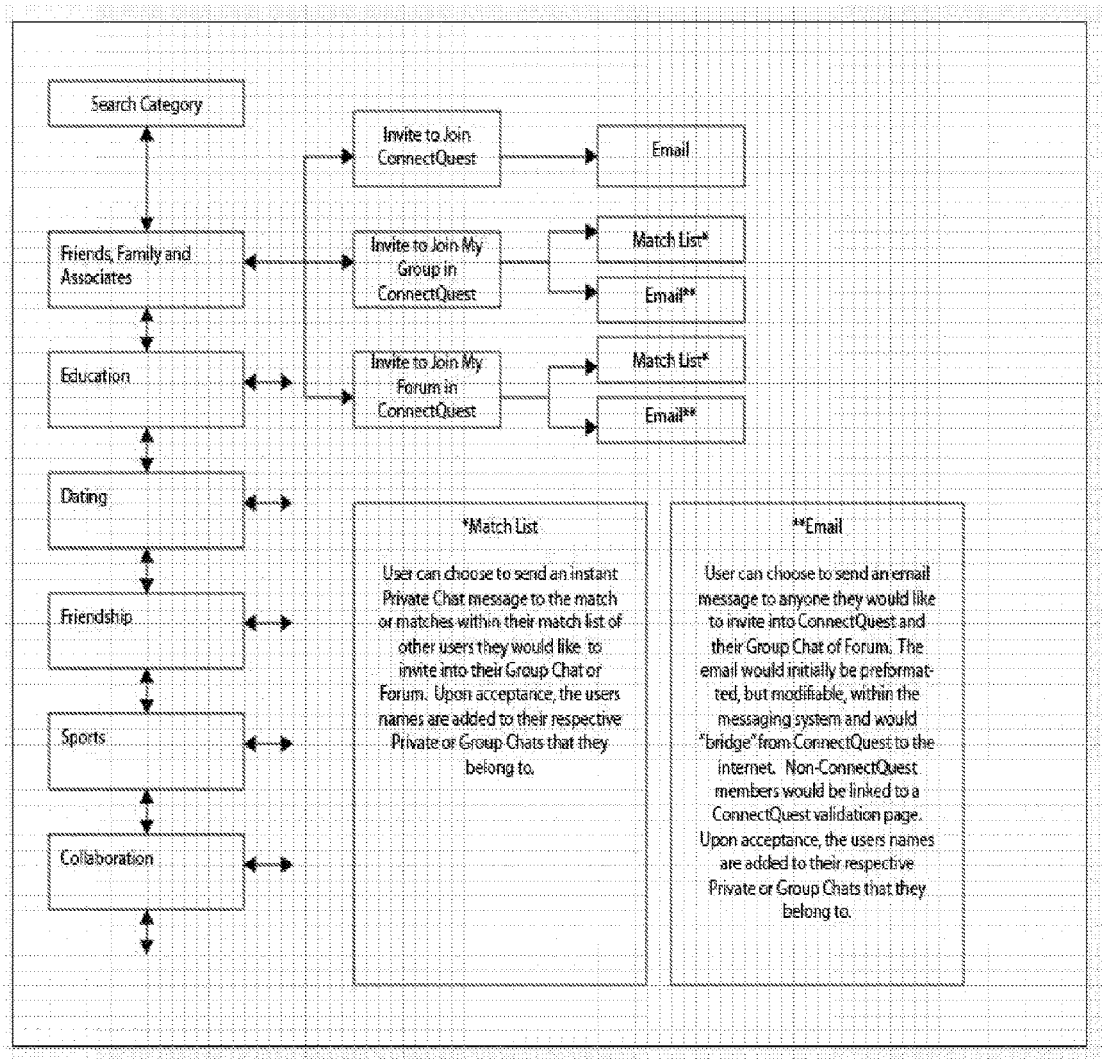
FIG. 2 is a block diagram detailing a workflow of user-selected searches.

Searches are created from a ConnectQuest™ "command" screen or home page. In one embodiment, on first-use users are prompted to the "Build New Search" function. By tapping the "Build New Search" button, users can create new searches or add additional searches. In one embodiment, first-time users who log into the system do not have any unique searches running. However, the system prompts these users to define their search criteria from a large and diverse, yet easy-to-use database search engine. As shown in FIG. 2, search categories include, without limitation:
Education
Dating
Friendship
Sports
Collaboration
Friends, Family & Associates Users can choose search criteria for the above categories and "drill down" to specific details and specific locations and search radii. Once a search is created, the mobile application's Match-O-Meter™ function shows a total count of all matches available worldwide within the ConnectQuest™ community. Match-O-Meter™ is a feature of the application which displays a total count of ConnectQuest™ members who meet a user's search criteria. Users can then use a "Local" Match-O-Meter™ in real-time to choose more specific details, including the location the search should originate from, search radius, and other search criteria to drill-down to a lower, more-specific number of higher-quality, desirable results. Additionally, users may add photos taken with their mobile computing devices or choose images from a photo gallery.

In one preferred embodiment, when new users complete their initial log-in they arrive at a "Build New Search" page. In this embodiment, there are two options for the user: (1) "Meet New People," or (2) "Buy, Sell and Services." By selecting "Meet New People", the system (1) determines the user's location, (2) builds a pre-configured "Default Search" showing all users within the "Social" grouping arranged geographically from nearest to greatest distance (primary sort) and newest to oldest (secondary sort). The "Default Search" box has a user-selectable button to its right labeled "Narrow My Search" which enables users to define searches with increased specificity. The results shown for a given search are referred to as "matches," or users in the ConnectQuest™ community who meet the another user's search criteria.

Each found match contains a "User Name" for the match, how long the match has been in the system, the distance the match is from the searching user, and one or more pictures and, at the match's option, a personal comment. In addition, there is a "Save & Contact Now" user-selectable button to the right of each match box. Selecting this relocates the associated match into the "Saved Matches" directory and takes the user to an "Instant Chat" page.

If users choose to optimize the initial "Default Search," they are returned to a "Select and Edit My Search Criteria" page. If they initially choose "Meet New People" a number of discreet choices are provided, namely: Education, Dating, Friendship, Sports, and Collaboration. By initially choosing "Buy, Sell and Services," users are presented with the default choices of "Buying and Selling," "Real Estate" and "Transportation."

Figure 3A:
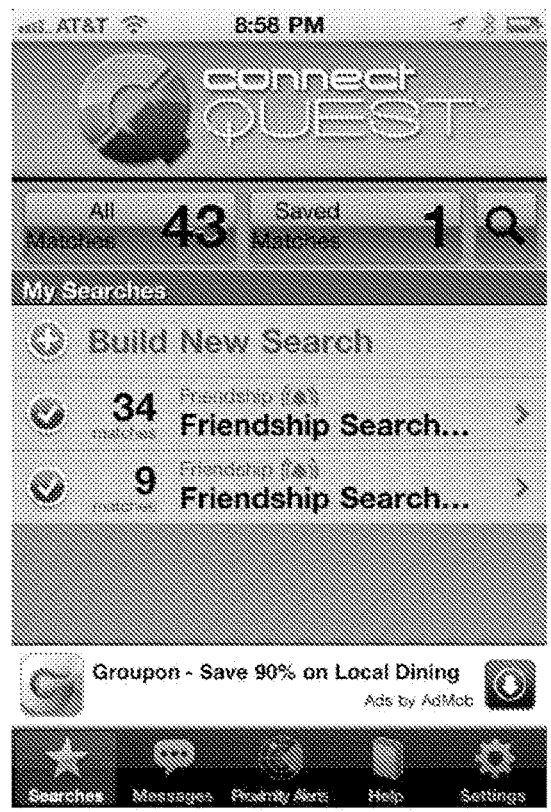
FIGS. 3A and 3B are visual representations of search results provided on a mobile computing device and computer.
Figure 3B:

The ConnectQuest™ "command" screen or home page is shown in FIG. 3. Once users have created one or more searches, the Match-O-Meter™ shows a total count of all matches (nineteen here) and saved matches (ten), based on one or more searches previously created in the "Build New Search" function of the present invention. The "My Searches" function located directly below the Match-O-Meter™ is a list of the current match counts for each of the individual searches the user has created; there are three in FIG. 3, for example. If a close proximity alarm, described more fully below, is enabled for a search, the alarm icon is shown to the right of the category. Under each category is a search detail summary, which provides details about the search. By tapping either "All Matches" or "Saved Matches" in the Match-O-Meter™ at the top of the screen, users can view all of their "Current Matches" or "Saved Matches" in one list.

Figure 4:
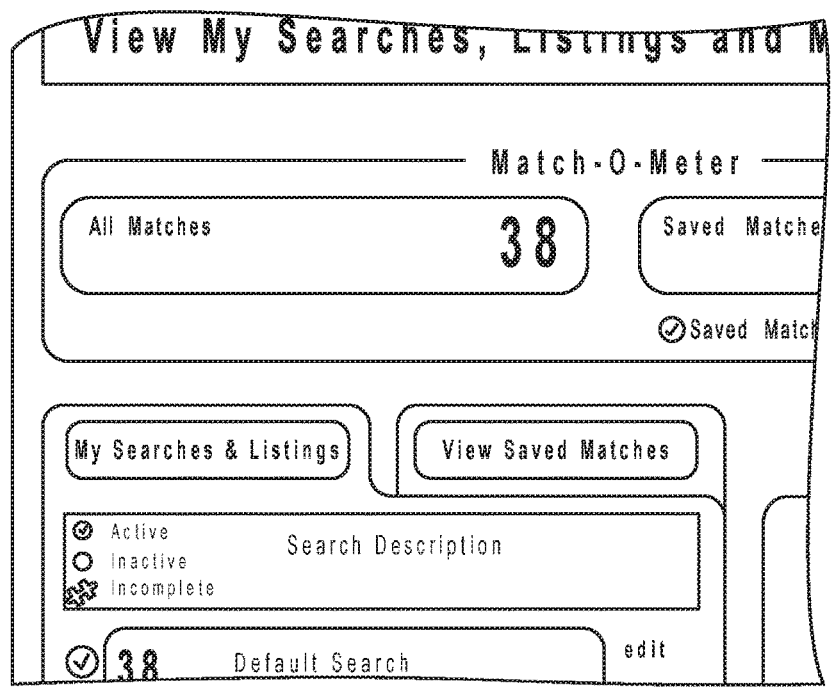
FIG. 4 is a visual representation of the incomplete notification provided in one embodiment of the present invention.

Users receive an "incomplete" notification as shown in FIG. 4 when required search criteria are not specified by the user. In one embodiment, incomplete notification is removed. Thus, if users fail to complete any required fields within the "Build New Search" or editing modes, a warning message appears and users are prevented from completing the process until the required fields are completed, eliminating the need for an incomplete notification alert.

The system "Quick Search" mechanism enables a user to create a search "on-the-fly", which search is not stored in the system. In one preferred embodiment, the "Quick Search" mechanism is streamlined such that the user is no longer required to create a search. In this embodiment, the search process functions in a more intuitive fashion from the perspective of the user. Specifically, upon clicking the "Quick Search" button, users can enter one or more search terms. These terms are searched against keywords, descriptions and filter values of searches in the database, and matching searches are displayed and grouped by category. Users are then able to view details of matching searches, save matches, and send messages to matching users. The Quick Search is an instant real-time function and is therefore not added to a user's saved searches. In this embodiment, the database, middleware and mobile application are each modified accordingly. Specifically, the database in this embodiment requires additional flags in its search table to designate "Quick Search" entries, and the search logic is modified accordingly. New stored procedures to search across categories are implemented. Similarly, the middleware and mobile application are updated to support the Quick Search functionality.

In another preferred embodiment, a message is added to certain searches (such as those relating to social networking, dating and friendship) encouraging users to add pictures and comments to their searches. In this embodiment the database is modified to store flags indicating whether the system has already reminded the user of a particular search (to avoid nuisance messages), and to provide support for such messages in both the middleware and the mobile application.

The present invention discretely determines the state or country of origin of each user and offers the ability for end users to search for matches by geographical or political location through the use of internet protocol (IP) or other position-locating options known in the art. The system automatically determines and generates an alphabetical pull-down list of countries, or countries/states, accessible as search criteria so that end-users are able to select one or more countries in which they wish to search, enabling them to communicate both internationally and locally. This function is extremely useful when combined with the "Quick Search" function for locating extended family members. Importantly, the sever utilized in the present invention receives location information for each user and identifies which users are in a given geographic area. For this reason, mobile devices using the system and method of the present invention do not have to continuously transmit their positions, thereby conserving mobile device power.

Figure 5:
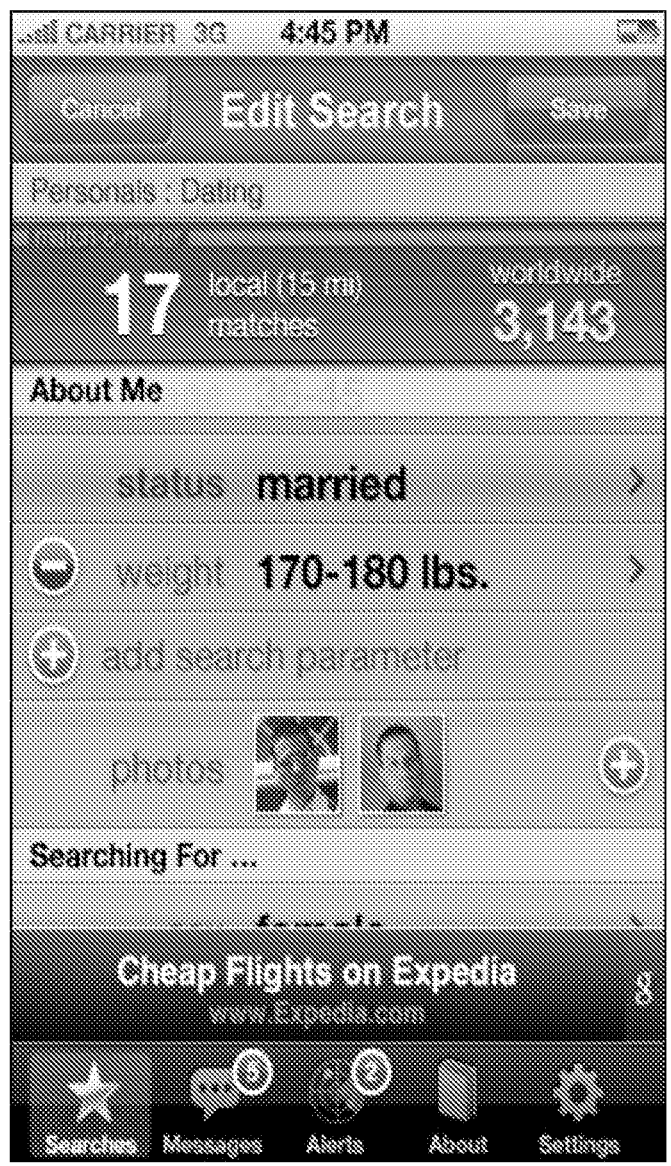
FIG. 5 is a visual representation of search results using a 15-mile radius.

A ConnectQuest™ "Edit" screen provides an easy-to-use interface on which users can modify their search criteria. Using the Match-O-Meter™, users can instantaneously review the updated results of modifications they have made to their search criteria. The screen of FIG. 5 shows that the user is looking for a social contact within a 15-mile radius. Based on the user's search criteria, the Match-O-Meter™ indicates there are 3,143 ConnectQuest™ users who match the search criteria within the entire ConnectQuest™ community and 17 users within the user's chosen 15-mile proximity. Notably, photos and images can also be added, deleted, edited, and cropped by the user.

Figure 6:
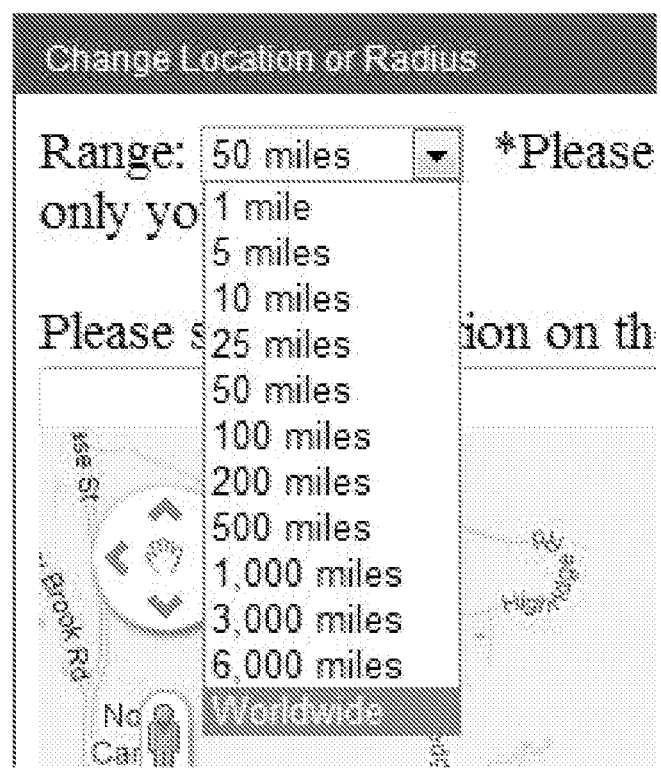
FIG. 6 is a visual representation of the automated search radius of the present invention.

In one preferred embodiment, all user-generated searches begin with a default 5-mile search radius from a given start location as shown in FIG. 6, which radius automatically increases in range in discreet increments until a system-designated minimum number of matches (preferably 10) results from the search criteria provided. Modifications made to the search criteria result in new automated searches. The automated search feature may be turned off or over-ridden at the discretion of the user.

Matches

Figure 7:
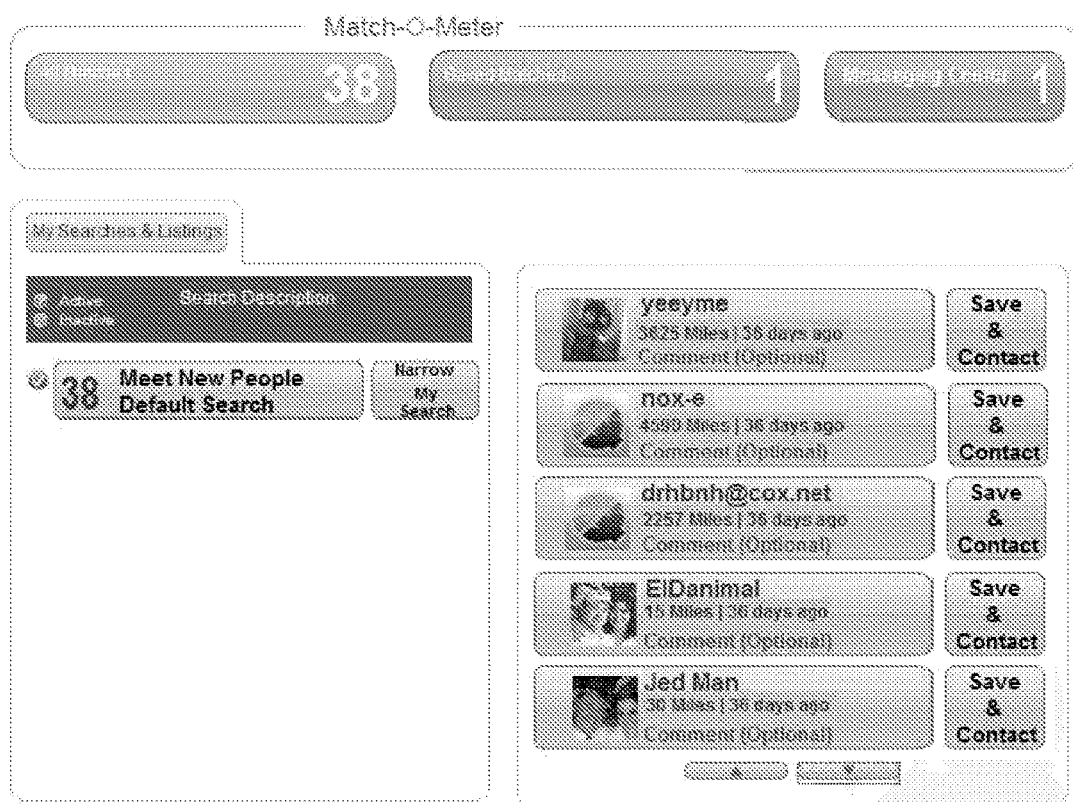
FIG. 7 is a visual representation of a "view matches" screen provided in one embodiment of the present invention.

FIG. 7 shows the ConnectQuest™ "View Matches" screen. This list shows matches made within the Connect- Quest™ community based on search criteria chosen by a user. Each match may include a photo, if available, the name of the match, and the category from which the match was selected. Additionally, if there has been any communication between users, a message icon may appear next to the user making the communication. Users can tap on any of the matches to view more details, or save the match for viewing at a later time.

Figure 8:
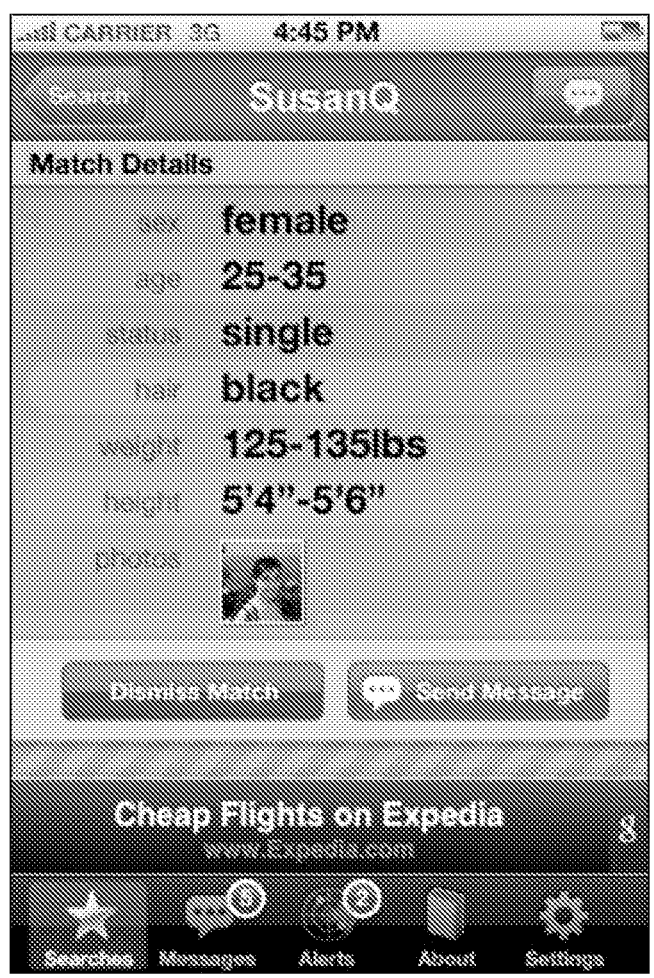
FIG. 8 is a visual representation of the details of a match in one embodiment of the present invention.

The ConnectQuest™ "Match Detail" screen shown in FIG. 8 shows the details of a particular match. Specifically, it shows required and optional information, if any, the matched user has provided, along with any photos he or she may have attached to a particular search. If the match has photos, the user can tap on the photo to see a full-sized image. If the user wishes to contact this match he or she can tap on "Send Message," which opens a message-editing window. If the user wants to ignore this user in future matches, he or she may select "Dismiss Match."

Messaging Functionality

Figure 9:
FIG. 9 is a visual representation of a "messaging center" in one embodiment of the present invention.

The application's "Messaging Center," a representation of which is provided at FIG. 9, is designed for user retention. It enables ConnectQuest™ users to communicate with other ConnectQuest™ users in a variety of ways.

The "Private Message" function enables users to discretely instant message other ConnectQuest™ users. Instant messaging is a form of real-time direct text-based chatting communication in push mode between two or more people using personal computers or other devices, along with shared clients. "Push mode" refer to a mode which does not require user-implemented prompts. Users are instantly notified on the ConnectQuest™ main page if other users have communicated with them. The system identifies those users and the time and date of their messages.

A "Group Chat" function enables users to create groups and invite any number of other people into those groups to share information and ideas. A "Public Forum" function allows users to create and manage their own "forums" within the ConnectQuest™ community. In addition to posting text, all ConnectQuest™ message screens in this embodiment are multimedia screens. Users can post virtually any kind of media their device is designed to support, including without limitation music, movies, video, photos, etc. Users are able to share ideas, concepts and media, all without leaving the ConnectQuest™ mobile application.

Figure 10:
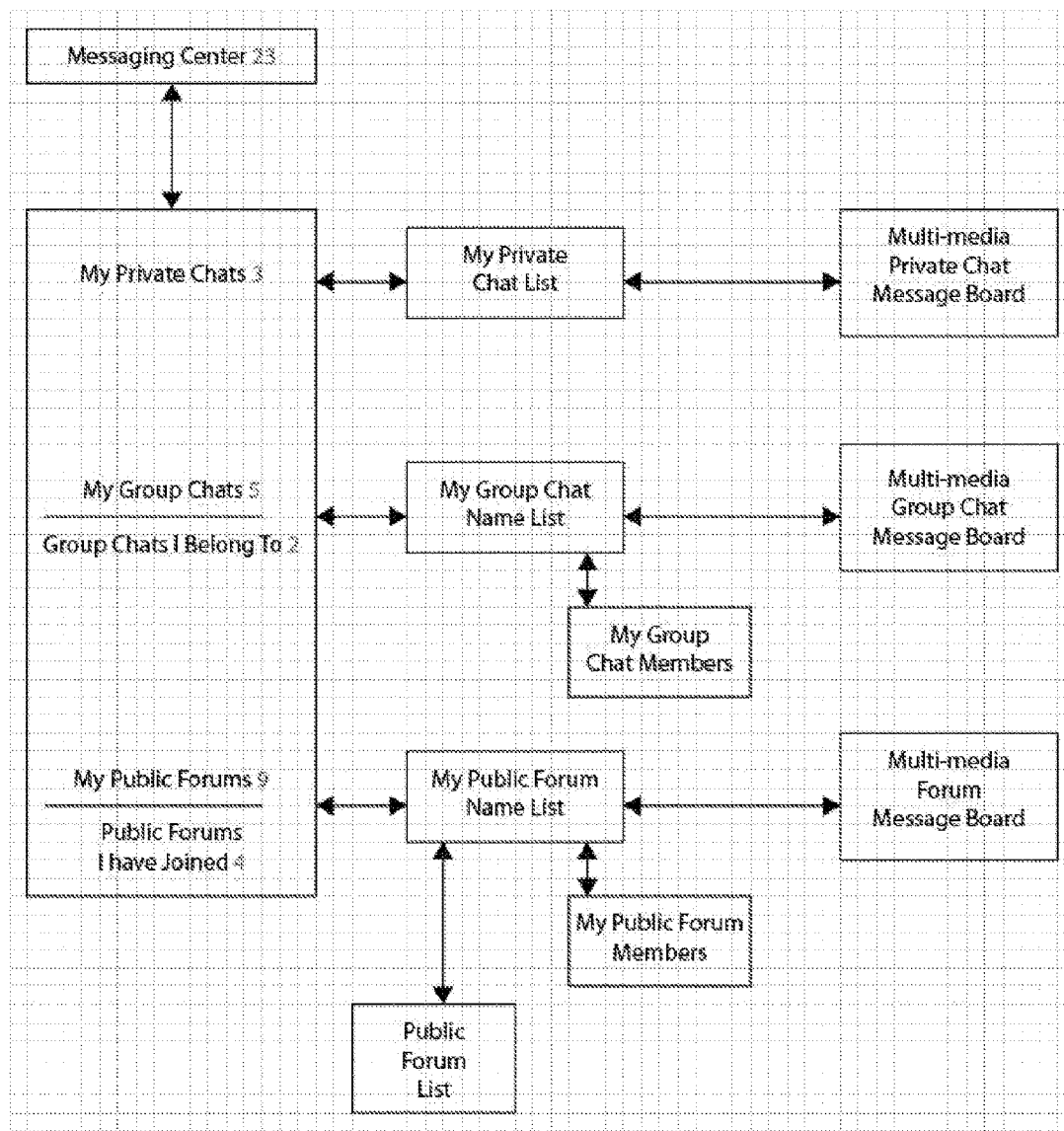
FIG. 10 is a block diagram detailing the workflow of a messaging center in one embodiment of the present invention.
Figure 11:
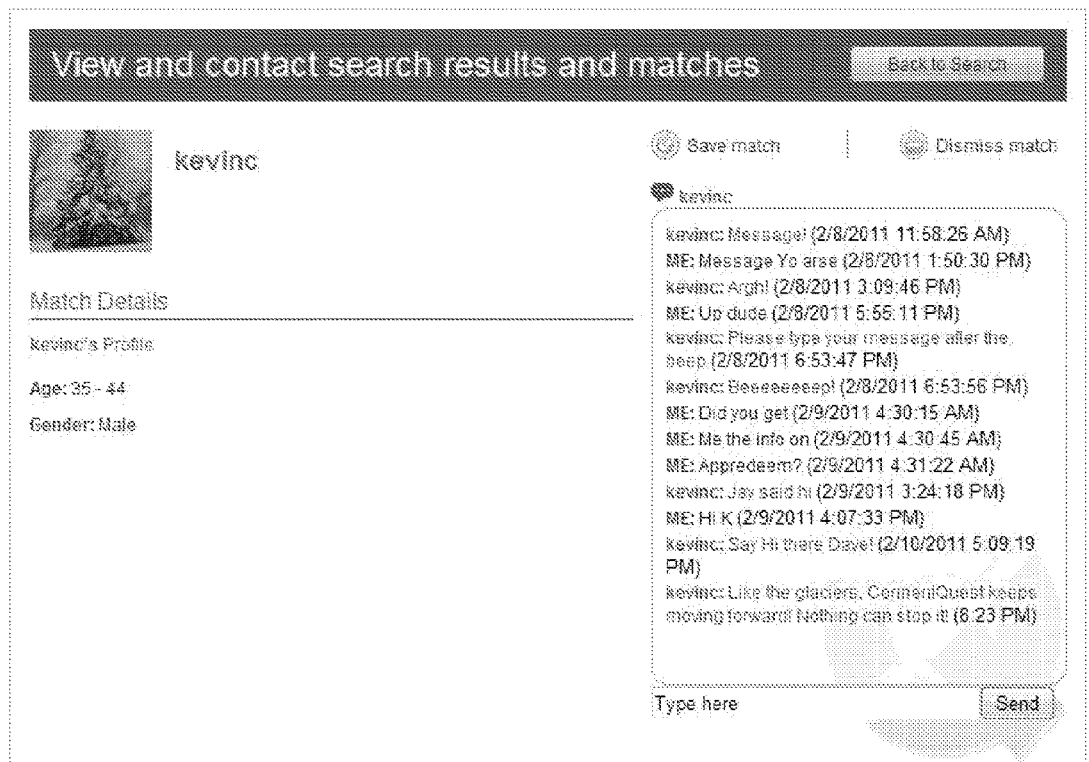
FIG. 11 is a visual representation of multi-format instant messaging employed in one embodiment of the present invention.

In another preferred embodiment (see FIG. 10), the instant message functionality of the ConnectQuest™ application is designed so the user can send and receive instant messages as well as other multi-media formats (see FIG. 11) including, without limitation, photos, digital audio, video, movies, etc. Preferably, user input is made directly into the main messaging window (eliminating use of a separate box, such as a "Type here" box, and then requiring a user to click on a "Send" box). In this particular embodiment, users are able to tap on an appropriately labeled button to temporarily extend the messaging box to a larger physical size. The messaging box automatically returns to its normal size when the user leaves the messaging page.

In another embodiment, the instant messaging functionality of the present invention is redesigned, enhanced and expanded to offer three options:
1. Private chats;
2. Group chats; and
3. Public forums.

Figure 12A:
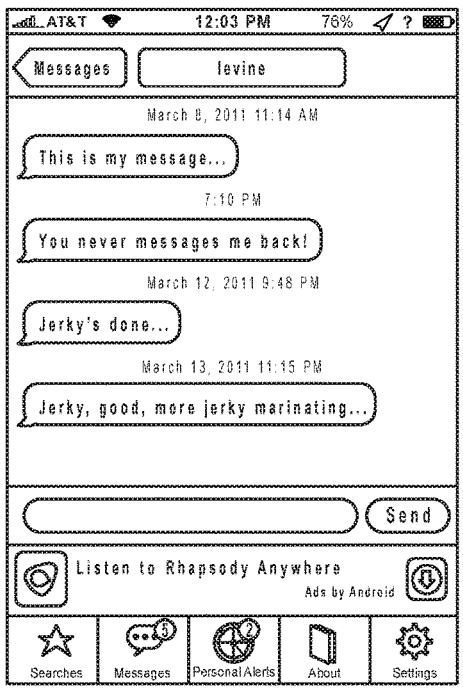
FIGS. 12A and 12B are visual representations of a message view in one embodiment of the present invention.
Figure 12B:
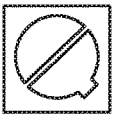

Private chat refers to instant messaging functionality as it exists in the art where users can send and receive threaded instant messages. A representation of the instant messaging feature of the present invention is shown at FIG. 12.

Group chat is a semi-private function which enables users to invite others to read and write to messaging windows.

Figure 13:
FIG. 13 is a visual representation of a "public forums" pull-down tab employed in one embodiment of the present invention.

Public forums refer to open blogs in which users create, name and manage one or more forums on any topic they choose. Forum names are posted under a "Public Forums" pull-down tab on the ConnectQuest™ main page shown at the top of FIG. 13. Any user can join a public forum and read and write to it however, only the user who created the forum has complete control over its content and membership.

If desired, users may contact matches by tapping on "Send Message" which opens an instant message editing window within the ConnectQuest™ "Message Center." The "Message Center" immediately alerts users if they have messages waiting in any of their message groups. The ConnectQuest™ "Message Summary" screen shown in FIG. 14 lists messages sorted by send date and time. Unread messages are shown with a blue dot. A photo appears next to users who have provided images in their search. Each user is listed by username, followed by the category in which the initial match was made. Tapping on any message header opens the message view, an example of which is shown in FIG. 12, which shows messages between two users. Messages are shown as left to right bubbles typically employed on the Apple® iPhone® or similar mobile computing device. At the bottom of the screen is a text box users can tap to respond to messages. Tapping on a given title of a message opens the match detail screen.

In addition to allowing text to be posted, ConnectQuest™ message screens are multimedia screens which permit users to post virtually any kind of media their device is designed to support including, without limitation, music, movies, photos, etc. Users are able to share ideas, concepts, and media, all without leaving the ConnectQuest™ mobile application.

Close Proximity Function

Figure 15:
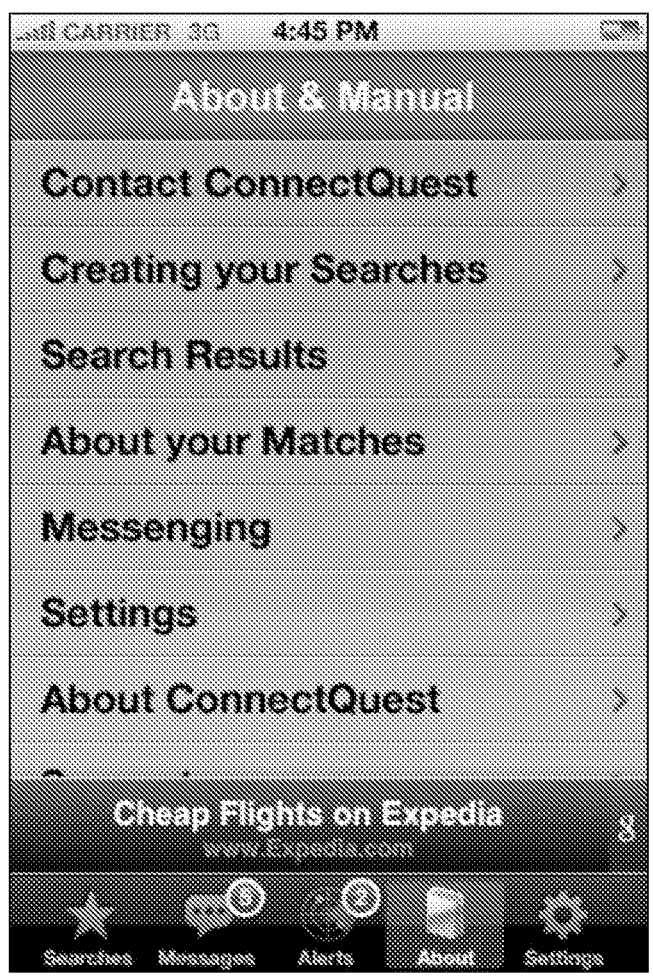
FIG. 15 is a visual representation of the "about & manual" screen employed in one embodiment of the present invention.

The ConnectQuest™ close proximity alarm, which may be turned on and off by the user, provides an audible and tactile alarm indicating when the user is in close proximity to a ConnectQuest™ community member who matches search criteria specified by the user. As used herein, "close proximity" refers to a range of within approximately 75 feet, and preferably within about 35 feet. Users may tap a "Make Contact" icon which activates a visual alarm (e.g., a flashing blue light) so the phone may be held overhead to initiate face-to-face contact with the match. Alternatively, users can view the match details for people within close proximity, send instant messages to them, save "Close Proximity Match" details for later, or dismiss the match. The "About & Manual" screen shown in FIG. 15 contains a user interface for copyright and other legal information, a user manual for the ConnectQuest™ mobile application, and a "Contact ConnectQuest™" button for suggestions, comments, and support.

Using RSS feeds readily available, in one embodiment the invention integrates Craigslist® data by region as transparent searches so that the ConnectQuest™ database is pre-populated with a variety of SKUs typical to what end-users look for. RSS refers to RDF Site Summary, a family of web feed formats used to publish frequently updated works—such as blog entries, news headlines, audio and video—in a standardized format. As used herein, SKUs are unique identifiers for distinct products and services that are purchased by a user. Searches can be performed by keyword, directed search and/or region. Craigslist® customers will be able to be directly contacted by ConnectQuest™ users through the ConnectQuest™ instant messaging system. This embodiment is not limited to integration with Craigslist®, and it is understood that the same approach may be used to access other available service-oriented websites, such as eBay®, to populate the ConnectQuest™ database.

In another preferred embodiment, the system adds a function to enable users to remove themselves from ConnectQuest™ should they so decide. In this embodiment, use of this function sends a notification message to ConnectQuest™ management for second-effort follow-through.

It will therefore be appreciated by those of skill in the art that the ConnectQuest™ mobile application is a novel, unique and powerful social networking tool designed to assist users in performing very directed searches in a geographic area selected by the user to achieve specific goals within the social, collaborative or e-commerce spaces; the systems and methods employed by ConnectQuest™ are novel because they provide, inter alia, diverse, directed searches by categories, including Education, Sports, Dating, Friendship, Collaboration, Buying, Selling, Property, and General Services; a unique and powerful database engine designed to maximize search efficiency and response; easy-to-use Match-O-Meter™ indicators which provide instant feedback of search results; "Close Proximity" person-to-person notifications for making contact; and instant messaging functionality. ConnectQuest™ enables people to find people they haven't met, to locate the resources and talent they want or need, and to pinpoint e-commerce buy, sell, and services.

ConnectQuest™ is implemented as a tab-based mobile application for use on an iPhone® or similar mobile computing device. The tabs appear on all screens (some elements may sit above the tabs however). The system provides four tabs: "Matches," "Messages," "About" and "Account." Additionally, the mobile application has a standard 320×50 application-wide advertising banner above the tab bar to enable advertisements to be displayed to users.

The ConnectQuest™ mobile application is built to be persistent. In other words, once logged in, users are not required to log in again unless they either log out of the mobile application or change their passwords on other devices. If a password is changed, all "linked" devices are cleared in the database and the system forces the user to log in the next time he or she starts the mobile application.

First Run Log In and Create Account

When the device is not linked to an account (either first-run, or logged-out user) the user is presented with a welcome screen, which includes legal statements or licenses to which the end-user must agree before creating an account.

Existing users simply tap on the "Log In" icon to navigate to the log-in screen. Tapping on "I Agree" brings up the form used to create an account.

Create an Account

Figure 16:
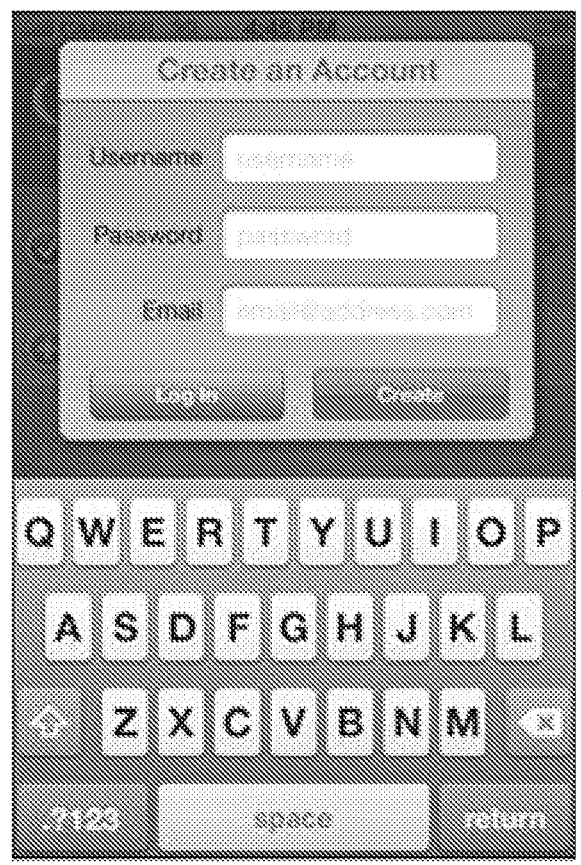
FIG. 16 is a visual representation of the "create an account" screen employed in one embodiment of the present invention.

Once users have agreed to the user license, they can create accounts using the screen shown in FIG. 16. To create an account users are required to provide, in one embodiment, a user name, password, and email address. If the user has reached the create account screen in error, he or she may tap on the "Log In" button to open the log-in screen.

Figure 17:
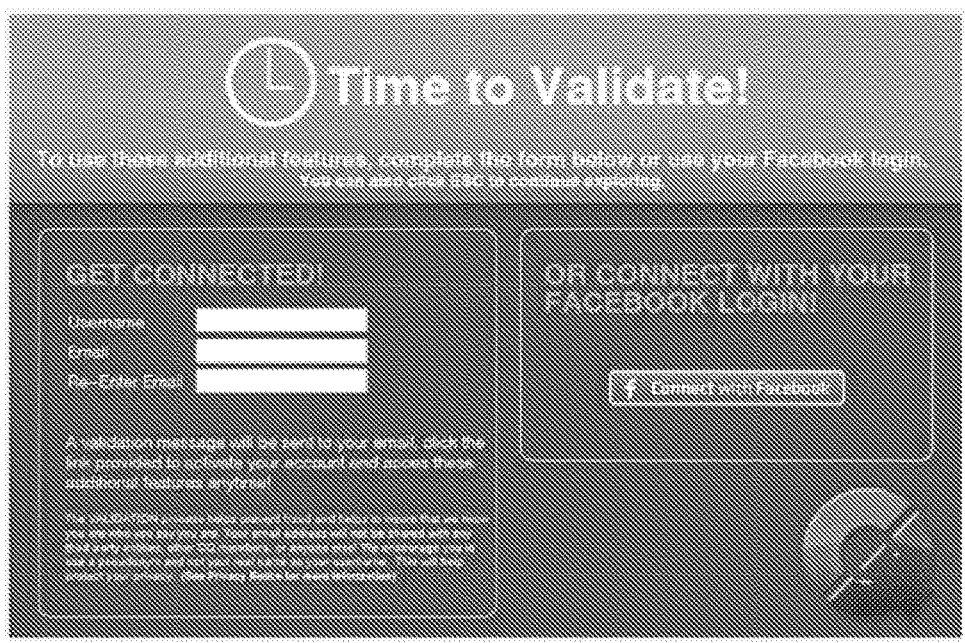
FIG. 17 is a visual representation of the validation feature in one embodiment of the present invention.

In one embodiment, an example of which is shown at FIG. 17, in order to use the mobile application the account must be verified with an email verification system. The server is configured to send an email to the user, and the website is configured to process the verification. Users may then return to the mobile application to log in. The verification email can individually provide a special URL that automatically launches the application if it is clicked on an iPhone® or similar mobile computing device which employs ConnectQuest™.

Enhanced Validation

In another preferred embodiment, in order to streamline the first-time use of the system by new users, the system is configured to be used before validating the email address of a user. The login screens do not require an email message initially. When an unvalidated user uses the mobile application, a message reminding the user to validate is presented on the main screen of the mobile application. When the user taps on this message or attempts to use a function of the mobile application which requires validation, a validation screen appears requesting his or her email address. Additional information is collected at this time including the user's age, birth date and location.

Features that are blocked for unvalidated users include messaging and saving matches. Optionally, there is a limit on the number of searches that can be created. In this embodiment, the database stored procedures are modified to allow unvalidated users to access required functions. The middleware and mobile application are changed accordingly to handle this validation workflow.

Log In to Your Account

Figure 18:
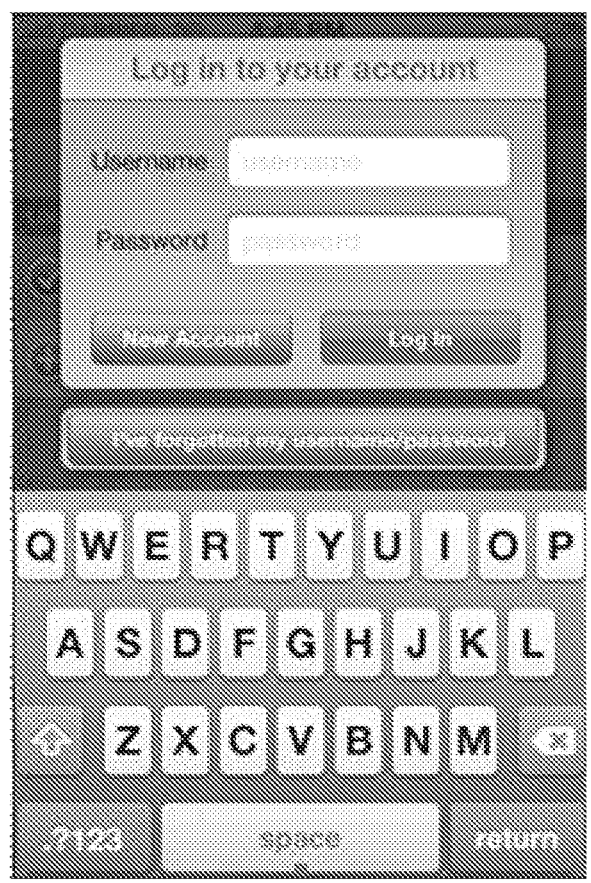
FIG. 18 is a visual representation of a log-in screen in one embodiment of the present invention.

The log-in screen shown in FIG. 18 features user name and password fields for user access to the system. Users who reach the log-in screen in error may tap the "New Account" button to navigate to the license agreement screen, where they can then access the new account screen. Additionally, on this screen users can tap "I've forgotten my username/password." The system requests the password, and the ConnectQuest™ server sends the username and password combination to the user.

Searches Tab

Main View

Figure 19A:
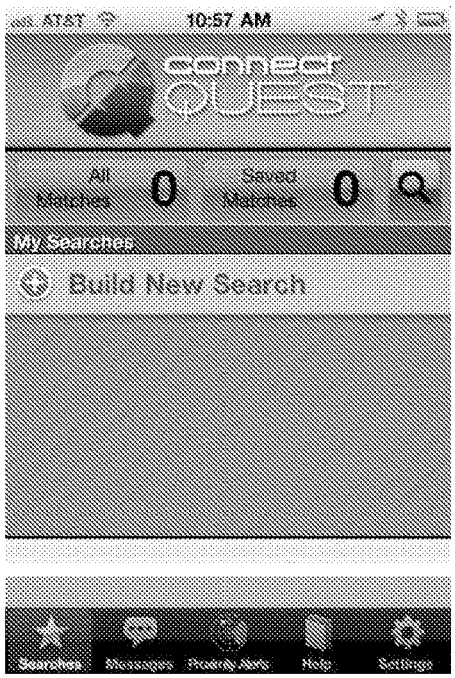
FIGS. 19A and 19B are visual representations of the command screens provided in a mobile computing device and computer employing the systems and methods of the present invention.
Figure 19B:
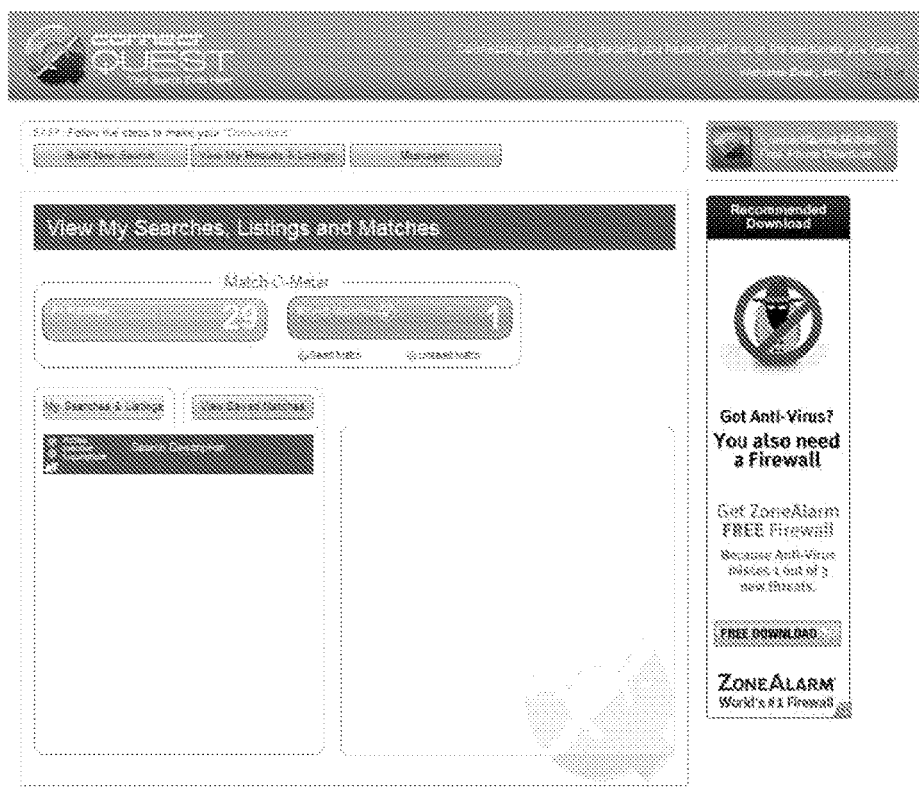

The match result screen shown in FIG. 19 is considered the "home" screen for the user. Here the system displays a total count of all matches, saved matches, and list of current match counts for each individual search. Inactive searches are shown on this list as well (sorted to the bottom of the list).

Information Displayed

The top of the screen shows two buttons that provide easy access to all current matches (individual searches grouped into one large list), and saved matches (individuals whose particulars the user has selectively chosen to save).

Under "My Searches" a user's individual searches are shown. The larger number represents a count of local matches for a particular search, "local" being dependent on the search criteria (i.e. radius) designated by the user. For example, a dating search may be set to 15 miles to enable a user to locate a date within close proximity, whereas an automotive search may be set to 50 miles.

The count describing the number of matches is designed to show up to three digits of results. If a search returns more than 999 results the system simply displays 999.

To the right of the match count is the category with which the match is identified. For a given search, the first category indicated is the top-most category, and the second category listed is the bottom category. To illustrate, if a result is categorized as Education>Someone to tutor me>music>violin, the match display shows "Education: Violin."

If a proximity alarm is enabled for a search, an alarm icon appears to the right of the category. Underneath the category are the details of the search. The display shows the search parameters used for that particular search.

Enable/Disable Searches

A search can be enabled or disabled by tapping a checkmark (or the blank circle) to the left of a search result. This allows users to remove searches from matches, without removing the searches themselves.

Creating a New Search

Figure 20:
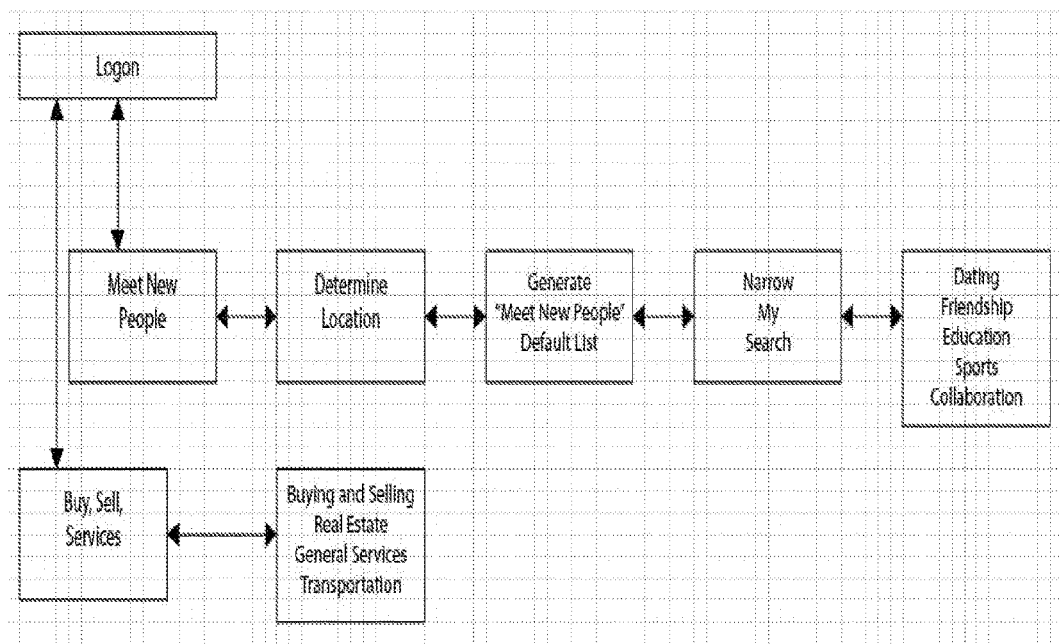
FIG. 20 is a block diagram detailing the workflow of options available to a user at log-in in one embodiment of the present invention.

The "Build New Search" button (shown in FIG. 19) allows users to create new searches. In one preferred embodiment, shown in FIG. 20, when new users complete their initial logon a "Build New Search" page appears, wherein there are two options: (1) meet new people, or (2) buy, sell and services. When "Meet New People" is selected, the system determines the user's location and builds a pre-configured default search shown by a "Default Search" box which shows all users within a "Social" grouping arranged from closest to farthest (primary sort) and newest to oldest (secondary sort). The "Default Search" box has a user-selectable button to its right labeled "Narrow My Search."

Each found match (FIG. 7) contains the "User Name" for the match, how long they have been in the system, their distance from the user, one or more pictures and, optionally, a personal comment. In addition, there is a "Save & Contact Now" user-selectable button to the right of each match box. Selecting this icon relocates the associated match into a "Saved Matches" directory and takes the user to an "Instant Chat" page.

If users choose to optimize their initial default searches, they are returned to the "Select and Edit My Search Criteria" page. If they initially chose "Meet New People," the system provides various discreet choices: education, dating, friendship, sports and collaboration. By initially choosing "Buy, Sell and Services," user are presented with the default choices of "Buying and Selling," "Real Estate" and "Transportation."

Viewing Search Results

Tapping on either the "All" or "Saved" matches buttons, or tapping on any search row, opens a screen with the actual search results.

First Run

First-time users will not have any unique searches running when they log into the system. In one embodiment, new users are provided with at least one pre-defined search.

Search Results

The search results screen shows the actual matches for a particular search.

Information Displayed

Figure 21:
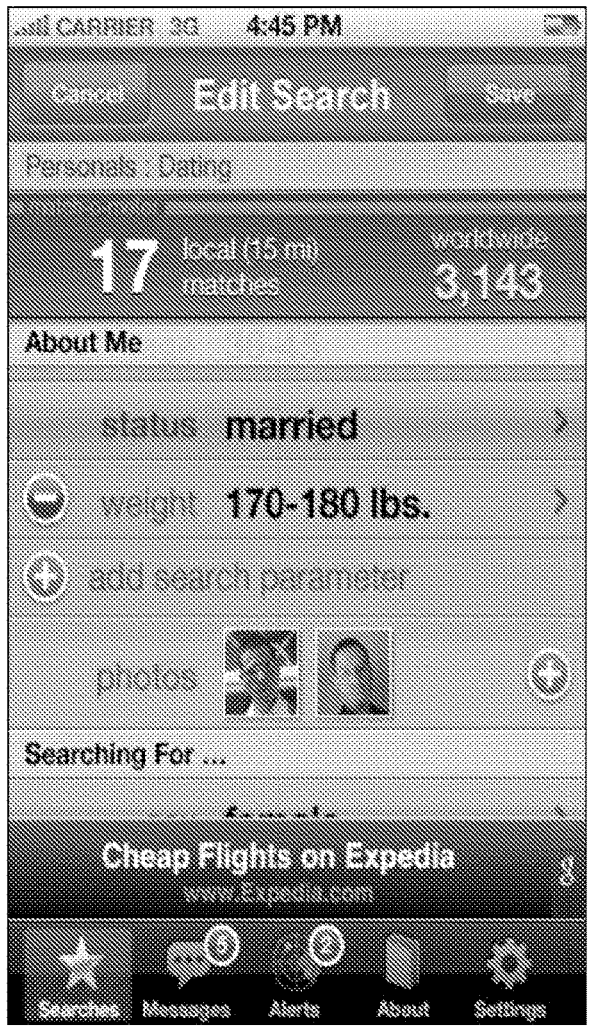
FIG. 21 is a visual representation of search parameters displayed in one embodiment of the present invention.
Figure 22:
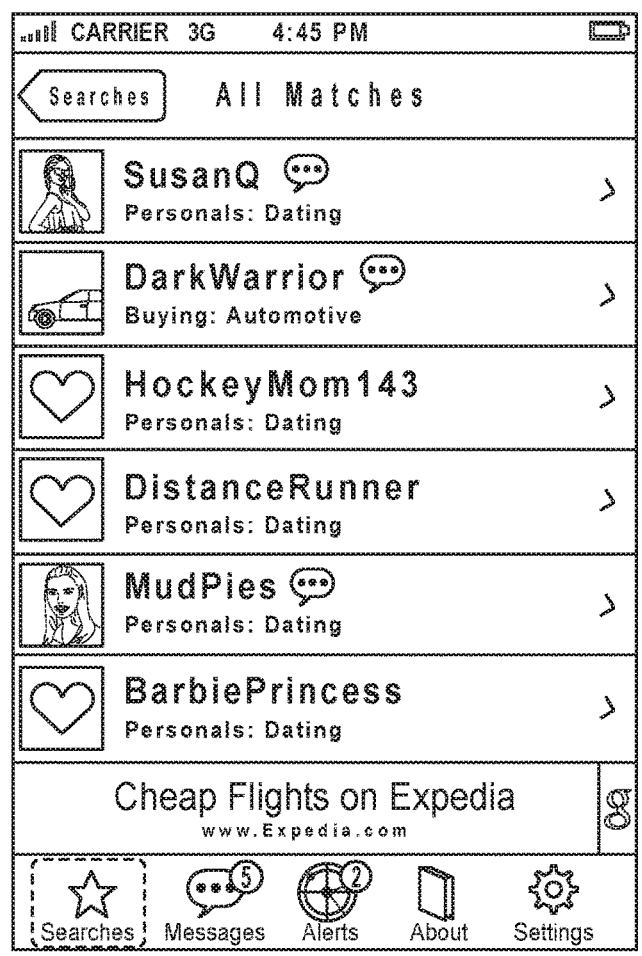
FIG. 22 is a visual representation of saved matches employed in one embodiment of the present invention.

The top of the screen shown in FIG. 21 is a horizontal, scrollable section which displays the search parameters for the current search. Users can swipe their fingers left or right to view additional details. Underneath the search parameters is a local result count (with range), and worldwide result count. To the right of the result counts is an "Edit Search" button, which enables users to edit their search parameters.

Under the overview information are the user's actual matches.

Match Information

Each match shows a thumbnail (if users have added one to their search details), user name, distance, and last update. If the user has not uploaded a photo to his or her search, the system will use a default icon, which varies depending on the search category. Additionally, any match with whom the user has exchanged messages is shown with a chat bubble icon next to his or her name.

Viewing Additional Match Details

Tapping on any match opens the match details screen shown in FIG. 21.

No Matches

If the number of local matches is zero, instead of a list of matches the list area shows a message such as "Your current search parameter is too constrained—Increase your search range or change your criteria to find matches." If there are no worldwide matches, the list area shows a message such as "Your current search parameters are too constrained—There aren't any users on ConnectQuest that match your current parameters."

Disabled Searches

If a search has been disabled, results and the result count area are not shown. In that event, a message appears in the list area "Your current search has been disabled—You must enable this search to view results." A button is shown allowing users to run searches from this screen.

All and Saved Matches

Figure 27:
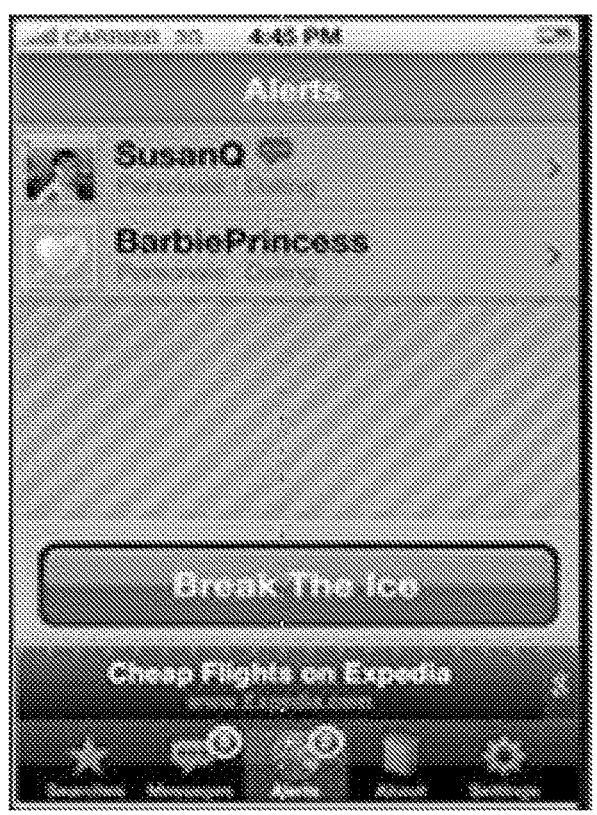
FIG. 27 is a visual representation of an alert tab in one embodiment of the present invention.

The list showing all matches or saved matches shown by way of example in FIG. 27 is similar to the "Search Results" screen, but does not show match counts or search details. The screen shows a list of all matches grouped into one list (or all saved matches). Each match shows an icon, if available, the name of the match, and the category from which the user was matched. Additionally, if there has been any communication from the user, the message icon appears next to the user.

New Search

Figure 23A:
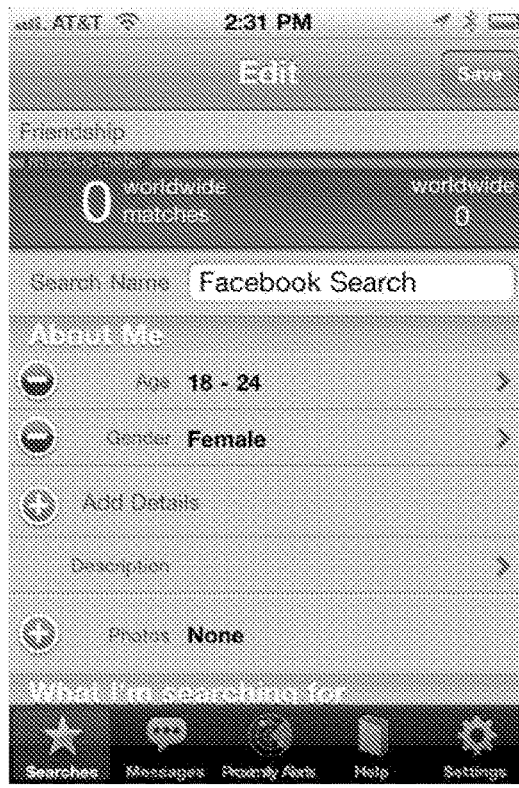
FIGS. 23A and 23B are visual representations of an edit screen on a mobile computing device and computer in one embodiment of the present invention.
Figure 23B:

If users creates new searches, they are presented with hierarchical tables commonly employed by an iPhone® or similar mobile computing device through which users can navigate to find the correct category for their matches. This table hierarchy supports an infinite depth to allow for future expansion. Upon selecting the final category level, users are shown the "Edit Search" screen, an example of which is illustrated in FIG. 23.

Edit Search "Edit Search" is a function by which users can change the specifics of their searches.

Information Displayed

The top of the screen shows a non-scrollable local and worldwide match count. These numbers are updated as users makes their selections. Below the match count is an edit screen, showing the details that users can modify. Some, but not all, searches are divided by "about me" and "searching for . . . " (for unlike matches).

Required Parameters

Some searches will have required parameters indicated by red boxes. Parameters that are required are shown in the search list and cannot be removed from the list.

Optional Parameters

Figure 24:
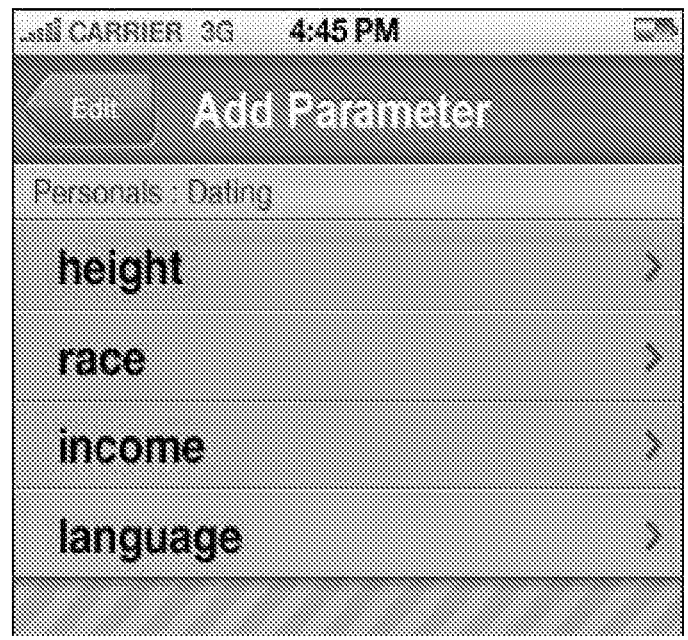
FIG. 24 is a visual representation of the "add search parameter" feature employed in one embodiment of the present invention.

Optional parameters are not be pre-populated in the search form. For such parameters, users need to implement "add search parameter." When users add new parameters they first choose the parameter, then they are brought to a screen, shown in FIG. 24, where they make the selection for the parameter. Optional parameters may be removed from the search by tapping the "−" button located to the left of the row. A dialog is displayed asking users to verify that they wish to delete the parameter.

Parameters

Parameters can either be a selection from a list, or a binary (on/off) switch. Binary switches appear in-line, whereas selections are performed through a standard iPhone® tableview. Selections support a selection hierarchy for future use and help simplify complex selections.

Text Description

At the bottom of any search may be a text box, which allows the user to enter free-form text to further describe his or her search interests.

Setting a Static Location

Figure 25:
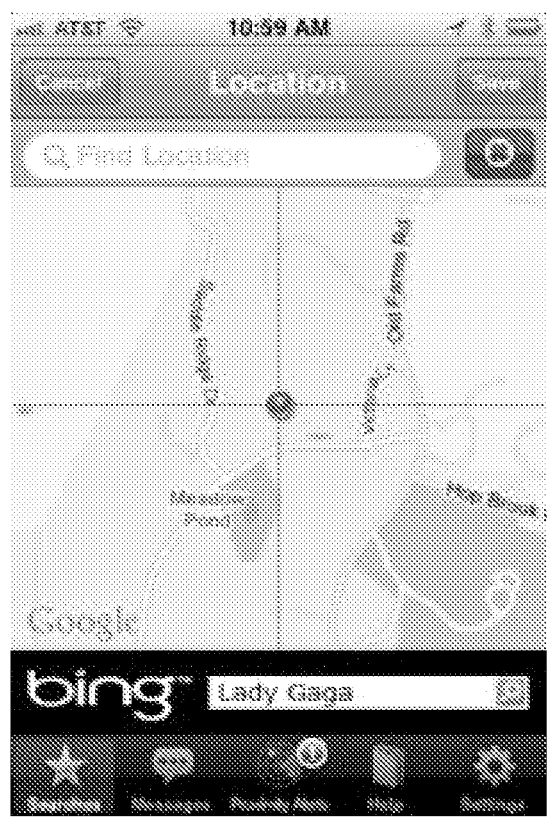
FIG. 25 is a visual representation of a location editing screen in one embodiment of the present invention.

For some searches it may be necessary to set a location (selling a house, for instance). The server allows users to set static locations with a special "location" parameter type. When users wish to change their locations, they are shown the location-editing screen, an example of which is shown at FIG. 25. Users can use standard, built-in maps style zooming and moving gestures known in the art.

Alternatively, users can also use GPS to establish their current locations.

Lastly, users can use an address search bar to enter location information which is geo-coded on an external server. The external server returns the longitude and latitude to the mobile application, and the map is updated.

Database as the Gatekeeper

The database is in control of dependencies and acts as the verification system for data. When a change is made to an unsaved search the system passes current search selections to the database. The database, in turn, verifies dependencies and returns a list of valid selections and their values. The mobile application does not allow users to make further modifications to the form until the server has responded with the valid selections (to avoid changes by users that violate the rights of others). The system achieves this by alternately graying out the screen or displaying a spinning icon while the server is returning data.

By way of example, it is assumed a user is editing his search parameters for finding a used vehicle. The current search parameters are "Make: Nissan", "Model: Pathfinder," and the user changes the "make" to "Toyota." The iPhone® or other mobile computing device employed by the user sends the entire dataset to the server, the server determines that "Pathfinder" is not a "Toyota," and responds by clearing the model field.

Photos

All searches support the addition of photos. Tapping the "+" icon to the right of the photos cell opens a typical photo edit system, which asks users if they want to take a photo with the camera or choose an image from the gallery. It then allows users to crop their photos. Photos are uploaded to the server and stored in the database. The database returns a list of photo ids that the iPhone® or similar device will send to the database when the search is saved. Photos may be deleted by tapping "Delete Photo" in the photo detail popup (when the user taps on one of the photo thumbnails). In one preferred embodiment, the ConnectQuest™ mobile application handles/displays updates for up to 10 photos.

Saving Search

Tapping on the "Save" button in the top right of the screen saves a search and a user is returned to the "Search Parameters" screen shown in FIG. 21. Users who have not filled out the required fields receive the message "You must fill out the required search parameters to save this search," and two options: "Discard Search" and "Continue Editing." If the search is a previously saved search, however, the options available to the user are "Discard Changes" and "Continue Editing."

Deleting a Search

At the bottom of the edit screen is a red "Delete Search" button. Tapping on that button prompts the system to ask users to verify that they wish to delete the search.

Match Detail View

The match detail shows the details of a particular match, as shown in FIG. 27. Specifically, it shows any required and optional information the matched user has filled out, along with any photos the matched user has attached to his or her particular search.

Previously Connected

Figure 14:
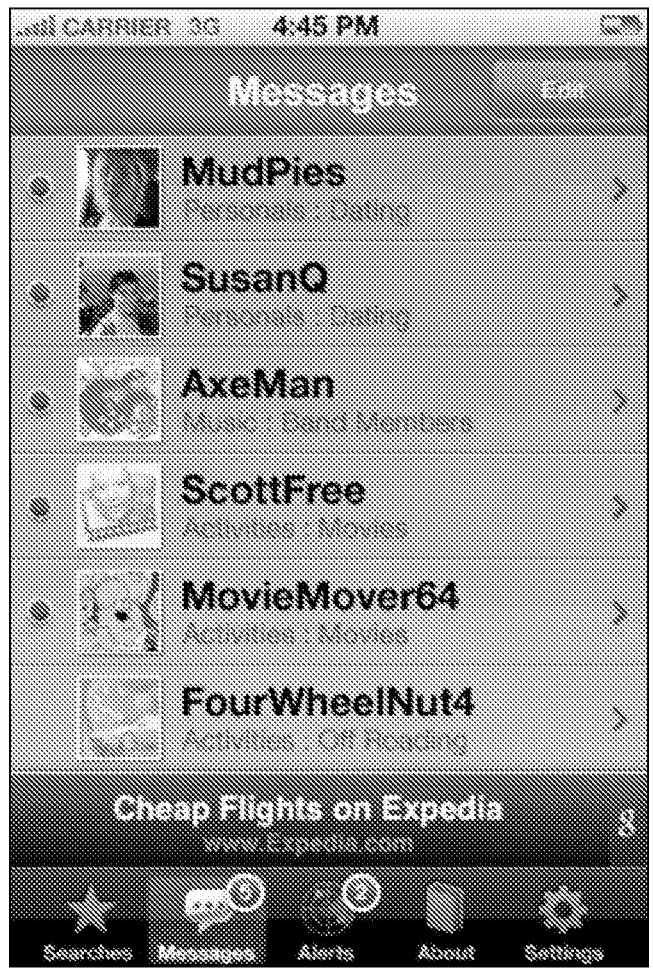
FIG. 14 is a visual representation of a "message summary" screen employed in one embodiment of the present invention.

If any contact has been made (users have already contacted the match, or the match has contacted the users), a button appears in the upper right corner that brings the user to a "Messages" screen as illustrated in FIG. 14. If the user has deleted the message chain from his or her message tab, the button does not appear.

Photos

If the match has photos, the user may tap on the photo to see a full-sized image.

Sending a Message

If users wish to contact their matches, they may tap on "Send Message" which opens a message-editing window.

Dismissing the Match

If a user wishes to ignore this match in future matches, he or she may select "Dismiss Match." A dialog is presented "Are you sure you want to dismiss this match? They will not appear in future searches," with "Dismiss Match" and "Cancel" provided as two options.

Messages Tab

The messages tab shows an "active number" indicator showing unread messages. Unread messages are system-specific, not device specific. Messages read on another device will be considered read on the iPhone® or similar device.

Message List

The message list shows a list of message sorted by send date/time. Unread messages are shown with blue dots. An icon is shown next to users who have provided images in their searches; otherwise, the system uses generic icons depending on the category of the search employed by the user. Each user is listed by user name, followed by the category in which the initial match was made.

Removing Message Chains

An entire message chain may be removed by swiping a message header left to right (typical iPhone® gesture), which reveals a "delete" button which users may tap. Alternatively, users may tap an "edit" button, which displays a "−" button next to each message header.

Tapping the "−" displays a "delete" button, and tapping the "delete" button removes the message chain.

Reading a Message (Chain)

Tapping on any message header opens the message view as depicted in FIG. 12.

Message View

The message view shows all messages exchanged between two users. No titles or advanced messaging features (pictures, etc.) are displayed. Messages are shown as left/right bubbles similar to iChat/SMS on the iPhone®. The bottom of the screen provides a text box which users can tap to respond to messages (the iPhone® SMS mobile application provides one example).

Viewing Match Details

Figure 26:
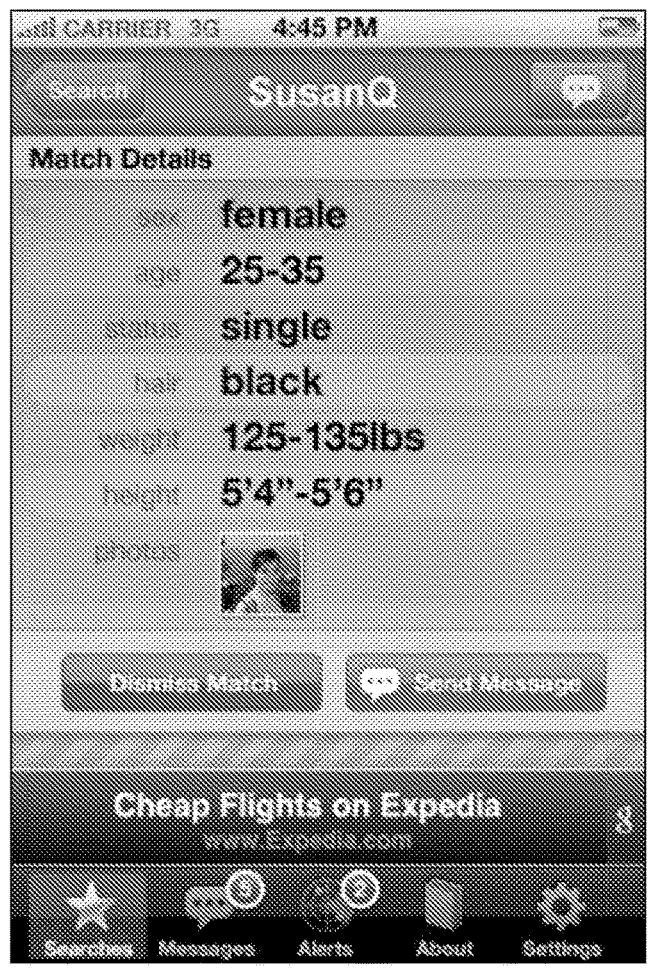
FIG. 26 is a visual representation of the "viewing match details" feature in one embodiment of the present invention.

The title of the message is shown as a button which may be tapped. Tapping on this button opens the match detail screen shown in FIG. 26.

Alerts Tab

When users have alerts enabled, and they pass into Bluetooth range of other users, the application alerts the first user that a second user is in range. In that event the system vibrates and plays back a sound, and also shows that the alert count has changed and provides an on-screen animation.

Tapping the alert tab (see FIG. 27) when there is only a single alert routes users directly to the detail page of a matched user. If more than one user is within range, the alert tab brings the user to a list of the matched users so the first user can view each of them in turn.

"Getting to Know People"

On any alert screen, a button appears which allows users to engage or disengage a "Make Contact" feature. "Make Contact" (or another suitable alert) flashes on the screen in such a way that the user can hold up the phone to be easily identified and located by a matched user. When the user has an alert enabled and the user passes into Bluetooth range of another user the ConnectQuest™ application alerts the user that one of these users is in range. The system vibrates and plays back a sound and shows that the alert count has changed with an on-screen animation. If the user taps on the alert tab and there is only a single alert, he or she is routed directly to the user's detail page. If more than one user is within range, the alert tab brings the user to a list of users so the user can view each match in turn.

"Meet Your Match"

On any alert screen, a button appears on screen that allows users to engage or disengage the "Meet Your Match" feature. "Meet Your Match" flashes the screen in such a way that users can hold up the phone to easily be identified by matched users.

About Tab

The about tab accesses the location for copyright and other legal information, as well as a user manual for the mobile application. All pages within this tab are HTML content pages saved within the mobile application.

Settings Tab

The settings tab is the screen for mobile application options and user account management.

Auto Alert & Make Contact

"Auto Alert" is a setting which, when turned on, automatically switches the view to the alert tab when a new proximity match is found. If "Auto Alert" is enabled, the "Make Contact," option becomes enabled allowing users to choose if the feature is automatically engaged (or disengaged) when they receive proximity alerts.

Log Out

Choosing "Log Out" routes users to the welcome screen and clears the persistence for the users so they need to log into their accounts again.

Change Password

Users who opt to change their passwords are asked for their current passwords and their desired passwords. Once users have changed passwords, the server clears the persistence of such passwords on any other device so that each device will ask for the password again.

Illustrated Embodiment

Figure 28:
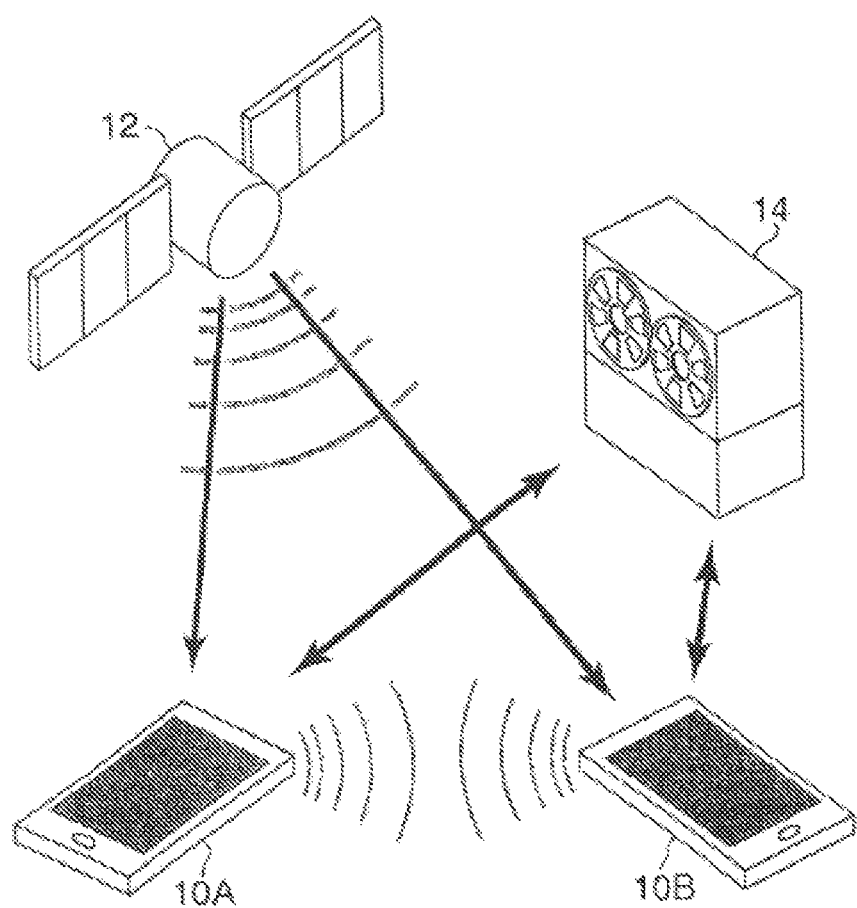
FIG. 28 is a simplified diagram of the systems and methods of the present invention.

With further reference to the drawings, FIG. 28 diagrammatically illustrates, in highly simplified form, a system embodying the present invention. It comprises two mobile computing devices (MCDs) 10A and 10B, which may be cell phones, smart phones, MP3 players, tablets, etc. Each MCD, 10A and 10B, is (1) capable of establishing interne connections; (2) equipped with means for providing, through communication with satellites 12, location-based (e.g., GPS-based) services for determining the geographical location of the device; (3) equipped with a short-range (e.g., 10 meters) wireless communication protocol (e.g., Bluetooth); (4) programmed with the ConnectQuest™ software application; and (5) and has established a ConnectQuest™ account for each registered user. As indicated by the associated sets of arcuate lines, each MCD, 10A and 10B, broadcasts a Bluetooth (or equivalent, short-range) signal, when activated.

The MCDs, 10A and 10B are in wireless communication, via the interne, with a ConnectQuest™ server 14, which has been programmed to store, in its database, data defining the criteria for one or more searches, for each user. The server 14 is capable of delivering search criteria information to all properly equipped and connected MCDs. The server 14 provides the means by which search criteria of system users are compared, and for determining when the criteria of one user sufficiently satisfies or matches those of another. When such a match has been determined to exist, the server 14 transmits relevant information (e.g., user ID, name, photograph) to the MCD of either or both matched users who are in the same vicinity (e.g., within a five mile radius), as indicated by GPS signals. Moreover, the transmission may occur with or without a user-implemented prompt in a pull or push mode, respectively.

When the mobile computing devices of matched users are in sufficiently close proximity, as established by reception of their respective, broadcast Bluetooth signals, the system initiates the generation of a notification or alarm signal, communicated to either or both of the MCDs. If the relevant user information was not already transmitted (in a "push" mode), either or both of the matched users may initiate such transmission in a "pull" mode after proximity is established by mutual interception of Bluetooth signals. Activation of a visible or audible signal on at least one of the user's mobile computing device may then be used to inform the other matched user of their proximity to one another, whereupon direct, person-to-person contact may be initiated.

It should be emphasized that the transmission of matched user data and proximity notifications and signals occurs solely by way of the internet connection that exists between each MCD, 10A and 10B, and the server 14. As indicated above, the interception of Bluetooth broadcast signals serves only as a trigger for initiation of a proximity notification or signal and, in the "pull" mode, transmission of data describing a matched user.

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety. Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation.

What is claimed is:

1. A computer program product for notifying at least one user $u_i$ of presence of at least one user $u_k$, the computer program product comprising:

a first non-transitory computer readable storage medium having stored thereon first program instructions executable by a first processor located on a server to cause the first processor to:

determine locations of users $u_i$ and $u_k$, wherein user $u_i$ has at least one electronic device, $e_i$, and user, $u_k$, has at least one electronic device $e_k$;

generate at least one pre-qualifying list of users $u_k$; and send, via a network, the pre-qualifying list to user $u_i$, wherein the pre-qualifying list is generated by the first processor based on criteria $c_i$ for user $u_i$, criteria $c_k$ for use $u_k$ and locations of users $u_i$ and $u_k$; and a second non-transitory computer readable storage medium having stored thereon second program instructions executable by a second processor located on the electronic device $e_i$ to cause the second processor to:
  detect when the user $u_k$ is within a close proximity of user $u_i$; and
  notify the user $u_i$ when the user $u_k$ is within the close proximity of user $u_i$ wherein the detecting and notifying are performed by the second processor independently of the network.

2. The computer program product of claim 1, wherein the location is determined by at least one location-based service (LBS).

3. The computer program product of claim 1, wherein the location of user $u_i$ is a static location selected by the user $u_i$.

4. The computer program product of claim 1, wherein the electronic device $e_i$ is in wireless internet communication with the server.

5. The computer program product of claim 1, wherein the electronic device $e_i$ sends a unique user identification to the server before receiving the pre-qualifying list.

6. The computer program product of claim 1, wherein the criteria, $c_i$ and $c_k$ comprise a set of user preferences.

7. The computer program product of claim 6, wherein the criteria comprise dating preferences, friendship preferences, collaboration preferences and/or purchasing preferences for the user $u_i$.

8. The computer program product of claim 1, wherein the first program instructions when executed by the first processor further cause the first processor to match criteria $c_i$ and $c_k$.

9. The computer program product of claim 1, wherein the second program instructions when executed by the second processor further cause the second processor to set up the criteria $c_i$.

10. The computer program product of claim 1, wherein the user $u_i$ is notified when a short-range wireless communication protocol determines the user $u_i$ to be within about 30 meters of user $u_k$.

11. The computer program product of claim 10, wherein the short-range wireless communication protocol comprises Bluetooth.

12. The computer program product of claim 10, wherein the short-range wireless communication protocol comprises RFID, Wibree, UWB (ultra-wideband), WUSB (wireless USB) and/or WLAN (wireless local area network) connection.

13. The computer program product of claim 10, wherein the user $u_i$ is notified when the short-range wireless communication protocol determines user $u_i$ to be within about 25 meters of another user $u_k$.

14. The computer program product of claim 13, wherein the short-range wireless communication protocol determines user $u_i$ to be within about 25 meters of another user $u_k$.

15. The computer program product of claim 1, wherein electronic devices $e_i$ and $e_k$ are mobile devices.

16. The computer program product of claim 1, wherein the second program instructions when executed by the second processor further cause the second processor to notify user $u_k$.

17. The computer program product of claim 16, wherein the notifying user $u_k$ is via a short range wireless communication protocol.

18. The computer program product of claim 1, wherein the close proximity is about 3 meters.

19. The computer program product of claim 1, wherein the detecting includes using a short range wireless communication protocol.

20. The computer program product of claim 1, wherein the second program instructions when executed by the second processor further cause the second processor to:
  based on the detecting, determine that user $u_k$ is on at least one of the pre-qualifying lists, wherein the notifying is responsive to the determining and the determining is performed by the second processor independently of the network.

* * * * *